United States Patent
Chao et al.

(10) Patent No.: US 7,852,829 B2
(45) Date of Patent: Dec. 14, 2010

(54) PACKET REASSEMBLY AND DEADLOCK AVOIDANCE FOR USE IN A PACKET SWITCH

(75) Inventors: Hung-Hsiang Jonathan Chao, Holmdel, NJ (US); Jinsoo Park, Leonia, NJ (US)

(73) Assignee: Polytechnic University, Brooklyn, NY (US)

( * ) Notice: Subject to any disclaimer, the term of this patent is extended or adjusted under 35 U.S.C. 154(b) by 1145 days.

(21) Appl. No.: 10/872,332

(22) Filed: Jun. 18, 2004

(65) Prior Publication Data

US 2005/0025141 A1    Feb. 3, 2005

Related U.S. Application Data

(60) Provisional application No. 60/479,733, filed on Jun. 19, 2003.

(51) Int. Cl.
*H04L 12/28* (2006.01)
*H04L 12/50* (2006.01)

(52) U.S. Cl. .................... 370/352; 370/386; 370/395.1; 370/412; 370/413

(58) Field of Classification Search .................. 370/386, 370/389, 387, 388
See application file for complete search history.

(56) References Cited

U.S. PATENT DOCUMENTS

| | | | |
|---|---|---|---|
| 5,179,556 A | 1/1993 | Turner | |
| 5,600,795 A | 2/1997 | Du | ............................. 709/227 |
| 5,689,506 A | 11/1997 | Chiussi et al. | |
| 5,864,539 A | 1/1999 | Yin | ............................. 370/236 |
| 6,072,772 A | 6/2000 | Charny et al. | |
| 6,333,932 B1 | 12/2001 | Kobayasi et al. | ............. 370/389 |
| 6,396,815 B1 | 5/2002 | Greaves et al. | .............. 370/256 |
| 6,426,957 B1 | 7/2002 | Hauser et al. | ............... 370/413 |
| 6,449,275 B1 | 9/2002 | Anderson et al. | ........ 370/395.1 |
| 6,463,485 B1 | 10/2002 | Chui et al. | |
| 6,504,820 B1 | 1/2003 | Oliva | ......................... 370/232 |
| 6,621,824 B1 | 9/2003 | Lauffenburger et al. | ..... 370/412 |
| 6,628,657 B1 | 9/2003 | Manchester et al. | ...... 370/395.1 |
| 6,631,130 B1 | 10/2003 | Roy et al. | .................... 370/352 |
| 6,819,675 B2 | 11/2004 | Benayoun et al. | |
| 6,870,831 B2 * | 3/2005 | Hughes et al. | ............... 370/352 |
| 6,920,156 B1 | 7/2005 | Manchester et al. | ......... 370/522 |
| 6,954,428 B2 | 10/2005 | Gotoh et al. | |

(Continued)

OTHER PUBLICATIONS

Cooperatve Association for Internet Data Analysis, www.CAIDA. org, downloaded 2008, 1 page.

(Continued)

*Primary Examiner*—Huy D Vu
*Assistant Examiner*—Brandon Renner
(74) *Attorney, Agent, or Firm*—Woodcock Washburn LLP

(57) ABSTRACT

Practical packet reassembly in large, multi-plane, multi-stage switches is possible by using a scheduling technique called dynamic packet interleaving. With dynamic packet interleaving scheduling, if more than one packet is contending for the same output link in a switch module, an arbiter in the switch module gives priority to a partial packet (i.e., to a packet that has had at least one cell sent to the queue). The number of reassembly queues required to ensure reassembly is dramatically reduced (e.g., to the number of paths multiplied by the number of scheduling priorities). Deadlock may be avoided by guaranteeing (e.g., reserving) at least one cell space for all partial packets.

31 Claims, 13 Drawing Sheets

U.S. PATENT DOCUMENTS

| | | | |
|---|---|---|---|
| 6,973,092 B1* | 12/2005 | Zhou et al. | 370/412 |
| 7,016,365 B1* | 3/2006 | Grow et al. | 370/413 |
| 7,042,842 B2 | 5/2006 | Paul et al. | |
| 7,050,448 B2 | 5/2006 | Johnson et al. | |
| 7,068,654 B1 | 6/2006 | Joseph et al. | |
| 7,068,672 B1* | 6/2006 | Jones | 370/412 |
| 7,126,918 B2 | 10/2006 | Robert | |
| 7,136,356 B2 | 11/2006 | Suzuki et al. | |
| 7,142,553 B1* | 11/2006 | Ojard et al. | 370/421 |
| 7,145,873 B2 | 12/2006 | Luijten et al. | |
| 7,145,914 B2 | 12/2006 | Olarig et al. | |
| 7,154,885 B2 | 12/2006 | Nong | 370/380 |
| 7,180,857 B2 | 2/2007 | Kawakami et al. | |
| 7,366,165 B2 | 4/2008 | Kawarai et al. | |
| 7,443,851 B2 | 10/2008 | Fukushima et al. | |
| 7,453,801 B2* | 11/2008 | Taneja et al. | 370/230 |
| 7,464,180 B1 | 12/2008 | Jacobs et al. | |
| 7,486,678 B1 | 2/2009 | Devanagondi et al. | |
| 7,545,801 B2 | 6/2009 | Miller et al. | |
| 2001/0014096 A1* | 8/2001 | Zhou et al. | 370/395 |
| 2002/0054567 A1 | 5/2002 | Fan | 370/230 |
| 2002/0085578 A1 | 7/2002 | Dell et al. | 370/422 |
| 2002/0099900 A1 | 7/2002 | Kawarai et al. | 710/317 |
| 2002/0131412 A1 | 9/2002 | Shah et al. | |
| 2002/0191588 A1* | 12/2002 | Personick | 370/352 |
| 2003/0099194 A1 | 5/2003 | Lee et al. | |
| 2003/0118052 A1* | 6/2003 | Kuhl et al. | 370/474 |
| 2003/0123468 A1 | 7/2003 | Nong | 370/412 |
| 2003/0126297 A1 | 7/2003 | Olarig et al. | |
| 2003/0179774 A1* | 9/2003 | Saidi et al. | 370/468 |
| 2003/0223424 A1 | 12/2003 | Anderson et al. | 370/392 |
| 2003/0227906 A1* | 12/2003 | Hallman | 370/352 |
| 2004/0037313 A1* | 2/2004 | Gulati et al. | 370/465 |
| 2004/0213156 A1 | 10/2004 | Smallwood et al. | |
| 2005/0002334 A1 | 1/2005 | Chao | |
| 2005/0002410 A1 | 1/2005 | Chao | 370/412 |
| 2005/0025141 A1 | 2/2005 | Chao | 370/412 |
| 2005/0025171 A1 | 2/2005 | Chao | 370/412 |
| 2005/0201314 A1 | 9/2005 | Hirano | |
| 2006/0203725 A1 | 9/2006 | Paul et al. | |
| 2006/0239259 A1 | 10/2006 | Norman et al. | |
| 2008/0069125 A1 | 3/2008 | Reed et al. | |
| 2009/0028152 A1 | 1/2009 | Shimonishi | |

OTHER PUBLICATIONS

United States Patent and Trademark Office: Non-Final Office Action dated Jul. 16, 2007, U.S. Appl. No. 10/776,575, 8 pages.
United States Patent and Trademark Office: Final Office Action dated Aug. 8, 2007, U.S. Appl. No. 10/776,574, 5 pages.
United States Patent and Trademark Office: Non-Final Office Action dated Jan. 22, 2008, U.S. Appl. No. 10/776,574, 5 pages.
United States Patent and Trademark Office: Non-Final Office Action dated Sep. 4, 2007, U.S. Appl. No. 10/872,187, 6 pages.
United States Patent and Trademark Office: Final Office Action dated Feb. 12, 2008, U.S. Appl. No. 10/872,187, 8 pages.
United States Patent and Trademark Office: Notice of Allowance dated Mar. 14, 2008, U.S. Appl. No. 10/776,575.
United States Patent and Trademark Office: Non-Final Office Action dated Jul. 9, 2008, U.S. Appl. No. 10/872,187.
United States Patent and Trademark Office: Non-Final Office Action dated Jul. 25, 2008, U.S. Appl. No. 10/776,574.
United States Patent and Trademark Office: Final Office Action dated Feb. 4, 2009, U.S. Appl. No. 10/872,187.
United States Patent and Trademark Office: Non-Final Office Action dated Feb. 17, 2009, U.S. Appl. No. 10/776,574.
United States Patent and Trademark Office: Notice of Allowance dated Jun. 16, 2009, U.S. Appl. No. 10/776,575.
United States Patent and Trademark Office: Non-Final Office Action dated Jul. 14, 2009, U.S. Appl. No. 10/872,187.
United States Patent and Trademark Office: Notice of Allowance dated Oct. 8, 2009, U.S. Appl. No. 10/776,574.
United States Patent and Trademark Office: Non-Final Office Action dated Oct. 8, 2009, U.S. Appl. No. 10/776,575.
United States Patent and Trademark Office: Notice of Allowance Action dated Jan. 8, 2010, U.S. Appl. No. 10/872,187.

* cited by examiner

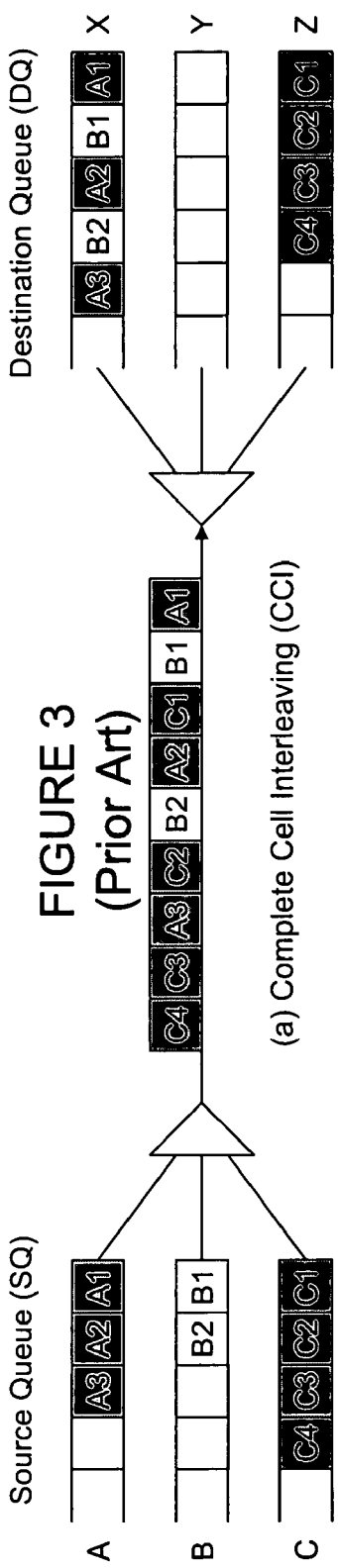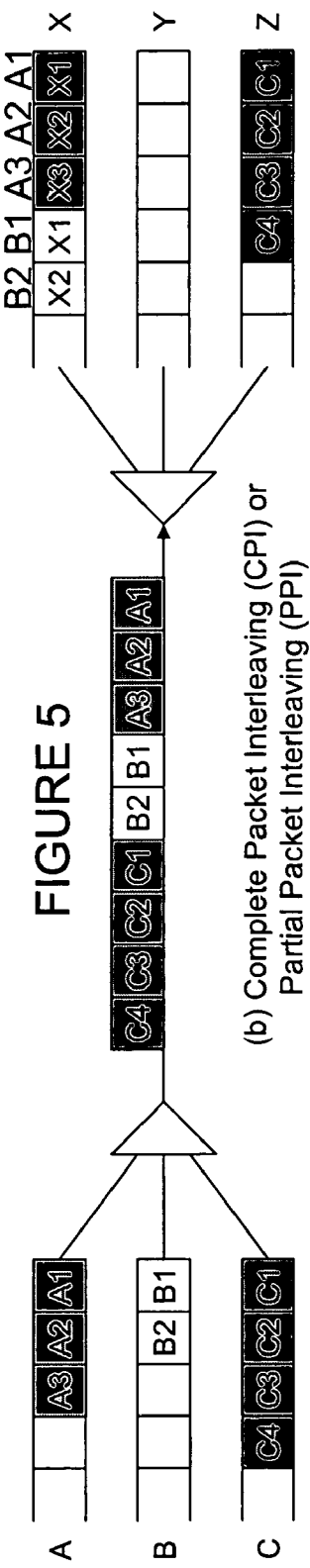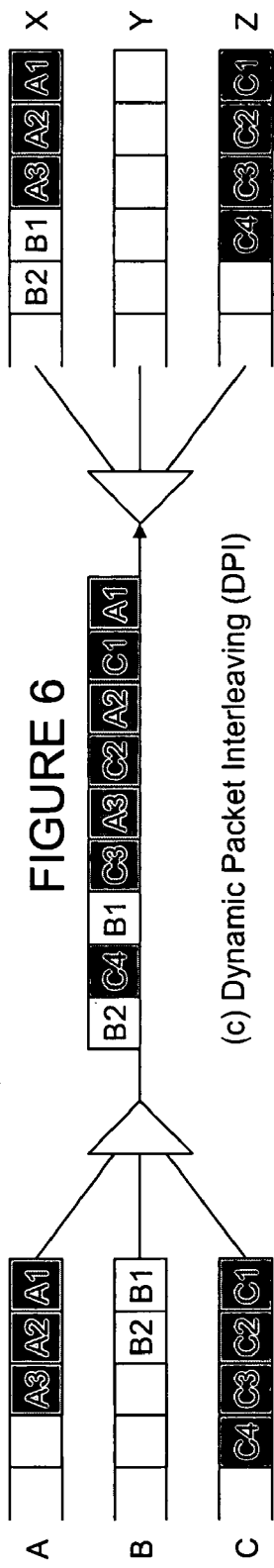

PACKET REASSEMBLY AND DEADLOCK AVOIDANCE FOR USE IN A PACKET SWITCH

§ 0.1 RELATED APPLICATIONS

This application claims benefit to U.S. Provisional Application Ser. No. 60/479,733, titled "A HIGHLY SCALABLE MULTI-PLANE MULTI-STAGE BUFFERED PACKET SWITCH," filed on Jun. 19, 2003, and listing H. Jonathan Chao and Jinsoo Park as inventors (referred to as "the '733 provisional"). That application is incorporated herein by reference. The scope of the present invention is not limited to any requirements of the specific embodiments described in that application.

§ 0.2 FEDERAL FUNDING

This invention was made with Government support and the Government may have certain rights in the invention as provided for by grant number ANTI-9906673 by the National Science Foundation.

§ 1. BACKGROUND OF THE INVENTION

§ 1.1 Field of the Invention

The present invention concerns communications. In particular, the present invention concerns large scale switches used in communications networks.

§ 1.2 Background Information

To keep pace with Internet traffic growth, researchers continually explore transmission and switching technologies. For instance, it has been demonstrated that hundreds of signals can be multiplexed onto a single fiber with a total transmission capacity of over 3 Tbps and an optical cross-connect system (OXC) can have a total switching capacity of over 2 Pbps. However, today's core Internet Protocol (IP) routers' capacity remains at a few hundred Gbps, or a couple Tbps in the near future.

It still remains a challenge to build a very large IP router with a capacity of tens Tbps or more. The complexity and cost of building such a large-capacity router is much higher than building an OXC. This is because packet switching may require processing (e.g., classification and table lookup), storing, and scheduling packets, and performing buffer management. As the line rate increases, the processing and scheduling time available for each packet is proportionally reduced. Also, as the router capacity increases, the time for resolving output contention becomes more constrained.

Demands on memory and interconnection technologies are especially high when building a large-capacity packet switch. Memory technology very often becomes a bottleneck of a packet switch system. Interconnection technology significantly affects a system's power consumption and cost. As a result, designing a good switch architecture that is both cost-effective and scalable to have a very large capacity remains a challenge.

The numbers of switch elements and interconnections are often critical to the scalability and cost of a switch fabric. Since the number of switch elements of single-stage switch fabrics is proportional to the square of the number of switch ports, single-stage switch fabric architectures are not attractive for large switches. On the other hand, multi-stage switch architectures, such as a Clos network for example, are more scalable and require fewer switch elements and interconnections, and are therefore more cost-effective.

FIG. 1 shows a core router (CR) architecture 100 which includes line cards 110,120 a switch fabric 130, and a route controller (not shown) for executing routing protocols, maintenance, etc. The router 100 has up to N ports and each port has one line card. (Note though that some switches have ports that multiplex traffic from multiple input line cards at the ingress and de-multiplexes the traffic from the switch fabric to multiple line cards at the egress.) A switch fabric 130 usually includes multiple switch planes 140 (e.g., up to p) to accommodate high-speed ports.

A line card 110,120 usually includes ingress and/or egress functions and may include one or more of a transponder (TP) 112,122, a framer (FR) 114,124, a network processor (NP) 116,126, and a traffic manager (TM) 118,128. A TP 112,122 may be used, for example, to perform optical-to-electrical signal conversion and serial-to-parallel conversion at the ingress side. At the egress side, it 112,122 may be used, for example, to perform parallel-to-serial conversion and electrical-to-optical signal conversion. An FR 114,124 may be used, for example, to perform synchronization, frame overhead processing, and cell or packet delineation. An NP 116,126 may be used, for example, to perform forwarding table lookup and packet classification. Finally, a TM 118,128 may be used, for example, to store packets and perform buffer management, packet scheduling, and any other functions performed by the router architecture (e.g., distribution of cells or packets in a switching fabric with multiple planes).

Switch fabric 130 may be used to deliver packets from an input port to a single output port for unicast traffic, and to multiple output ports for multicast traffic.

When a packet arrives at CR 100, it 100 determines an outgoing line to which the packet is to be transmitted. Variable length packets may be segmented into fixed-length data units, called "cells" without loss of generality, when entering CR 100. The cells may be reassembled into packets before they leave CR 100. Packet segmentation and reassembly is usually performed by NP 116,126 and/or TM 118,128.

FIG. 2 illustrates a multi-plane multi-stage packet switch architecture 200. The switch fabric 230 may include p switch planes 240. In this exemplary architecture 200, each plane 240 is a three-stage Benes network. Modules in the first, second, and third stages are denoted as Input Module (IM) 242, Center Module (CM) 244, and Output Module (OM) 246. IM 242, CM 244, and OM 246 often have many common features and may be referred to generally as a Switch Module (SM).

Traffic enters the switch 200 via an ingress traffic manager (TMI) 210 and leaves the switch 200 via an egress traffic manager (TME) 220. The TMI 210 and TME 220 can be integrated on a single chip. Therefore, the number of TM chips may be the same as the number of ports (denoted as N) in the system 200. Cells passing through the switch 200 via different paths may experience different queuing delays. However, if packets belonging to the same flow traverse the switch via the same path (i.e., the same switch plane and the same CM) until they have all left the switch fabric, there should be no packet out-of-sequence problem. FIG. 2 illustrates multiple paths between TMI(0) 210a and TME(0) 220a. The TMI 210 may determine the path ID (PID) of each flow using its flow ID (FID). The PID may correspond to a switch fabric plane 240 number and a CM 244 number in the plane 240.

In the embodiment 200 illustrated in FIG. 2, the first stage of a switch plane 240 includes k IMs 242, each of which has n inputs and m outputs. The second stage includes m CMs 244, each of which has k inputs and k outputs. The third stage includes k OMs 246, each of which has m inputs and n outputs. If n, m, and k are equal to each other, the three modules 242,244,246 may have identical structures.

From the TMI 210 to the TME 220, a cell traverses four internal links: (i) a first link from a TMI 210 to an IM 242; (ii) a second link from the IM 242 to a CM 244; (iii) a third link from the CM 244 to an OM 246; and (iv) a fourth link from the OM 246 to a TME 220.

In such a switch 200, as well as other switches, a number of issues may need to be considered. Such issues may include packet reassembly and deadlock avoidance.

Section 1.2.1 introduces the need for packet reassembly, as well as known packet reassembly techniques and their limitations.

§ 1.2.1 Packet Reassembly

When building a packet switch, it is a common practice to segment each arriving packet into multiple fixed-length cells (e.g., 64 bytes) at the input port, pass them through the switch fabric, and reassemble them back into packets with reassembly queues (RAQs) at the output port.

Cells may be classified into four categories: Beginning of Packet (BOP) cells; End of Packet (EOP) cells; Continue of Packet (COP) cells; and Single Cell Packet (SCP) cells. A BOP cell is the first cell of a packet. An EOP cell is the last cell of a packet. A COP cell is a cell between a BOP cell and an EOP cell. An SCP cell is a packet whose size is equal to or smaller than the cell payload size (e.g., 52 Bytes).

When cells are routed through the switch fabric, if more than one packet is contending for the same output link, and if output port contention arbitration is performed on a per cell basis rather than on a per packet basis, the cells can be interleaved in the switch fabric. Consequently, the output port may receive many partial packets and may need to store the partial packets until the last cell of the packet (i.e., EOP cell) arrives at the output port so that the packet can be reassembled from its constituent cells.

A cell is transferred over a link (such as one of the four internal links listed in § 1.2 above) from a queue at the upstream side to a queue at the downstream side. The term source queue (SQ) is used to denote the queue at the upstream side of a link, and the term destination queue (DQ) is used to denote the queue at the downstream side of a link.

Cells waiting at SQs attached to the same output link compete with each other. In the switch fabric described above, one link can send at most one cell in each cell time slot. If more than one cell is waiting at the SQs associated with the output link, an arbiter associated with the link should choose one of them for transmission in the next time slot and all the other cells have to wait at the SQs until they win the contention (assuming there are still other cells competing for the desired outgoing link).

This section explains scheduling algorithms from the perspective of the output link. Output links of TMI, IM, CM, and OM may have the same scheduling policy. One link has multiple SQs where cells are queued to be transmitted to multiple DQs in the next stage. The challenge is to deliver cells from the SQ to the DQ so that cell sequence integrity is maintained, while also providing high throughput and fairness.

§ 1.2.1.1 Previous Approaches and Their Limitations

FIG. 3 shows one possible scheduling scheme. The SQs are labeled A, B, and C, while the DQs are labeled X, Y, and Z. In this example, SQ(A) stores a three-cell packet destined for DQ(X), SQ(B) stores a two-cell packet destined for DQ(X), and SQ(C) stores a four-cell packet destined for DQ(Z).

As illustrated in FIG. 3, a simple way to send packets from SQ to DQ is to schedule "cells" in a round-robin fashion. The switch fabric can interleave cells without consideration of packet boundary. That is, regardless of the cell type (i.e., BOP, COP, EOP, or SCP), the switch fabric can interleave cells in round robin fashion. This scheme is referred to as the complete cell interleaving (CCI) scheduling scheme. The required number of reassembly queues (RAQs) in the CCI scheduling scheme is equal to the switch size (i.e., the number of input ports) multiplied by the number of scheduling priorities and the number of possible paths for a pair of input port and output port.

FIG. 4 is a flow diagram of an exemplary method 400 that may be used to implement the CCI scheduling scheme. Assume there are 64 SQs in a case with single priority and unicast mode. (If two priorities and both unicast and multicast are supported, the number of SQs becomes 256=64×2×2.) A counter is initialized (e.g., set to 0), and an index is set to a round-robin (RR) pointer. (Block 410) The arbiter scans 64 SQs beginning from the queue indicated by RR. More specifically, if the SQ is not empty and the DQ of the HOL cell at the SQ has a (or enough) free space (i.e., eligible?=YES), the HOL cell is sent over the link and the RR pointer of the arbiter is updated to the next SQ. (Blocks 430, 450, 460, 470) If the SQ is empty, the arbiter scans the next SQ until it finds a non-empty SQ with an eligible HOL cell. (Blocks 430, 440 and 450) With CCI, whether or not a HOL cell is eligible may be determined by checking whether or not the destination queue (DQ) has a (or enough) free space. This may be tracked using buffer and queue outstanding cell counters (BOC and QOC), and comparing those counts to source module (SM) buffer and queue size constants (B_sm and Q_sm) as described in the '733 provisional. In other words, if BOC is less than B_sm and QOC is less than Q_sm, the HOL cell is eligible. Otherwise it is not eligible.

If there is only one path for an input port-output port pair, the required number of RAQs is equal to the number of input ports multiplied by the number of scheduling priorities. Therefore, a virtual input queue (VIQ) can be used to reassemble the packet. This VIQ approach is adopted in many multi-plane single-stage switch fabrics, where the cells of a packet can be striped among the multiple planes.

The CCI scheduling scheme has a major drawback in that the number of reassembly queues (RAQs) can become very large in certain switch fabrics. Since cells are interleaved without any consideration of packet boundary, when they arrive at TME, they should be separated per packet. To ensure proper packet reassembly, the TME must have as many RAQs as the number of TMIs (i.e., N=n*k) multiplied by the number of scheduling priorities (i.e., q) and the number of possible paths between TMI and TME (i.e., p*m) For a multi-plane multi-stage switch such as the one illustrated in FIG. 2, the number of possible paths between an input-output pair is equal to the number of switch planes (i.e., p) multiplied by the number of center-stage switch modules (e.g., m in a Clos-network switch). Therefore, to ensure packet reassembly, the required number of RAQs in CCI scheduling scheme is p*q*n*k*m. For example, if p=8, q=2, n=m=k=64, then the required number of RAQs becomes 4 million queues, which is too large to be feasible.

As can be appreciated by the foregoing, although the CCI scheduling scheme has the best load-balancing among the possible paths and minimum cell transmission delays through the switch fabric (i.e., IM, CM, and OM), it may require too many queues at TME to reassemble the packet in large multi-plane, multi-stage switch fabrics.

In view of the foregoing, better packet scheduling and reassembly schemes are needed, particularly for large scale devices with multiple-stage, multiple switch plane switch fabrics. In any such scheme, deadlock situations should be avoided.

§ 2. SUMMARY OF THE INVENTION

The present invention may be used to make packet reassembly practical. It may do so by using a technique to perform a packet interleaving, instead of cell interleaving, throughout stages (e.g., every stage) of the switch fabric. One such technique is referred to as dynamic packet interleaving (DPI) scheduling scheme. If more than one packet is contending for the same output link in a switch module, the arbiter in the switch module gives priority to a partial packet (i.e., to a packet that has had at least one cell sent to the queue). The number of reassembly queues required to ensure reassembly is dramatically reduced to the number of paths multiplied by the number of scheduling priorities, and is independent of the switch size.

The present invention may be used to prevent a deadlock. The present invention may do so by guaranteeing (e.g., reserving) at least one cell space for all partial packets. If the destination queue for a partial packet has a non-zero outstanding cell counter, the link doesn't need to reserve a cell space in the downstream cell memory. However, if the outstanding cell counter for a partial packet is equal to zero, at least one cell space should be reserved to prevent a deadlock situation. That is, if the outstanding cell counter for the partial packet is greater than 0, the downstream cell memory assigns at least one cell space for the partial packet. This ensures that the EOP cell can be forwarded to its destination.

§ 3. BRIEF DESCRIPTION OF THE DRAWINGS

FIG. 3 is an example used to illustrate a complete cell interleaving scheduling technique.

FIG. 5 is an example used to illustrate a complete packet interleaving and partial packet interleaving scheduling techniques that are consistent with the present invention.

FIG. 6 is an example used to illustrate a dynamic packet interleaving scheduling technique that is consistent with the present invention.

Figures 13A, 13B:
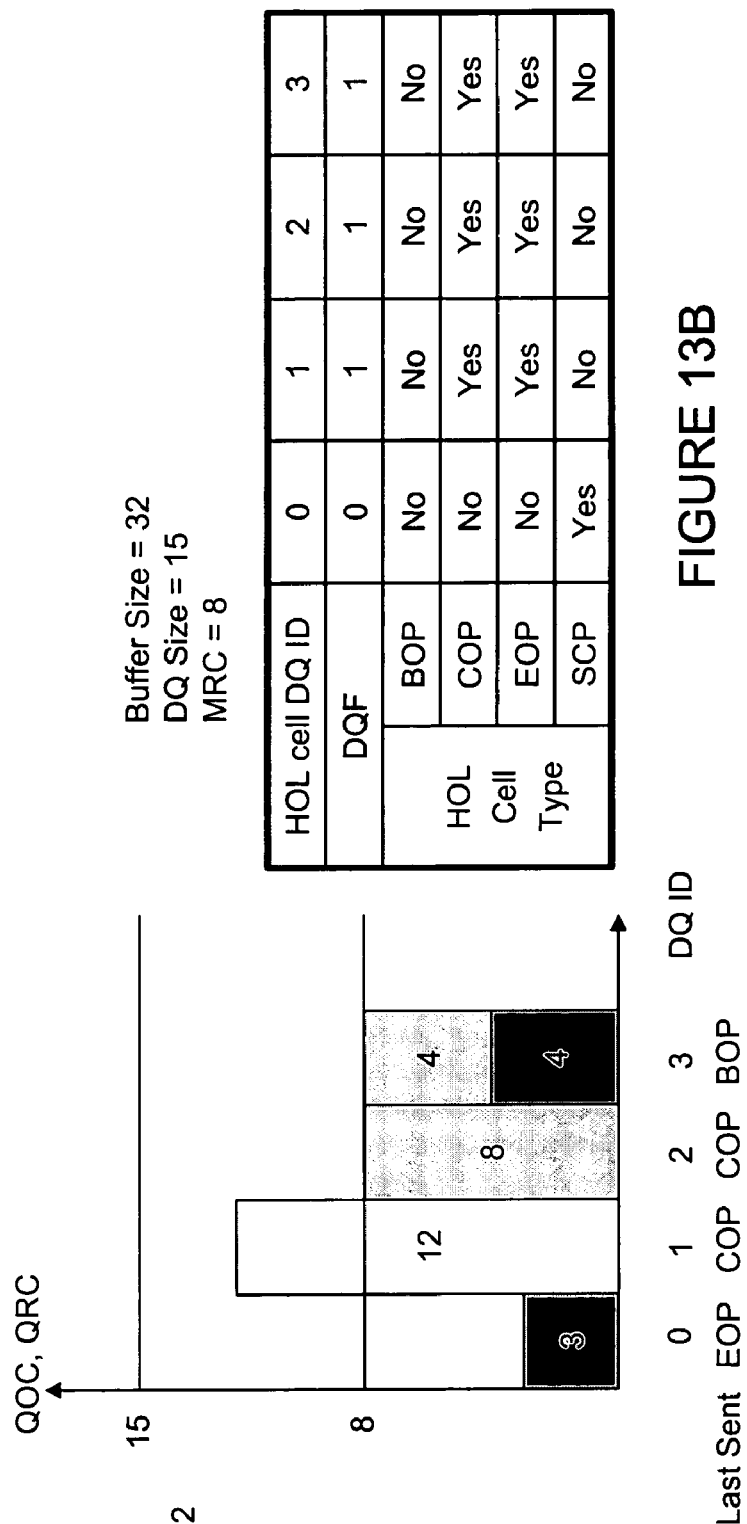
Figures 14A, 14B:
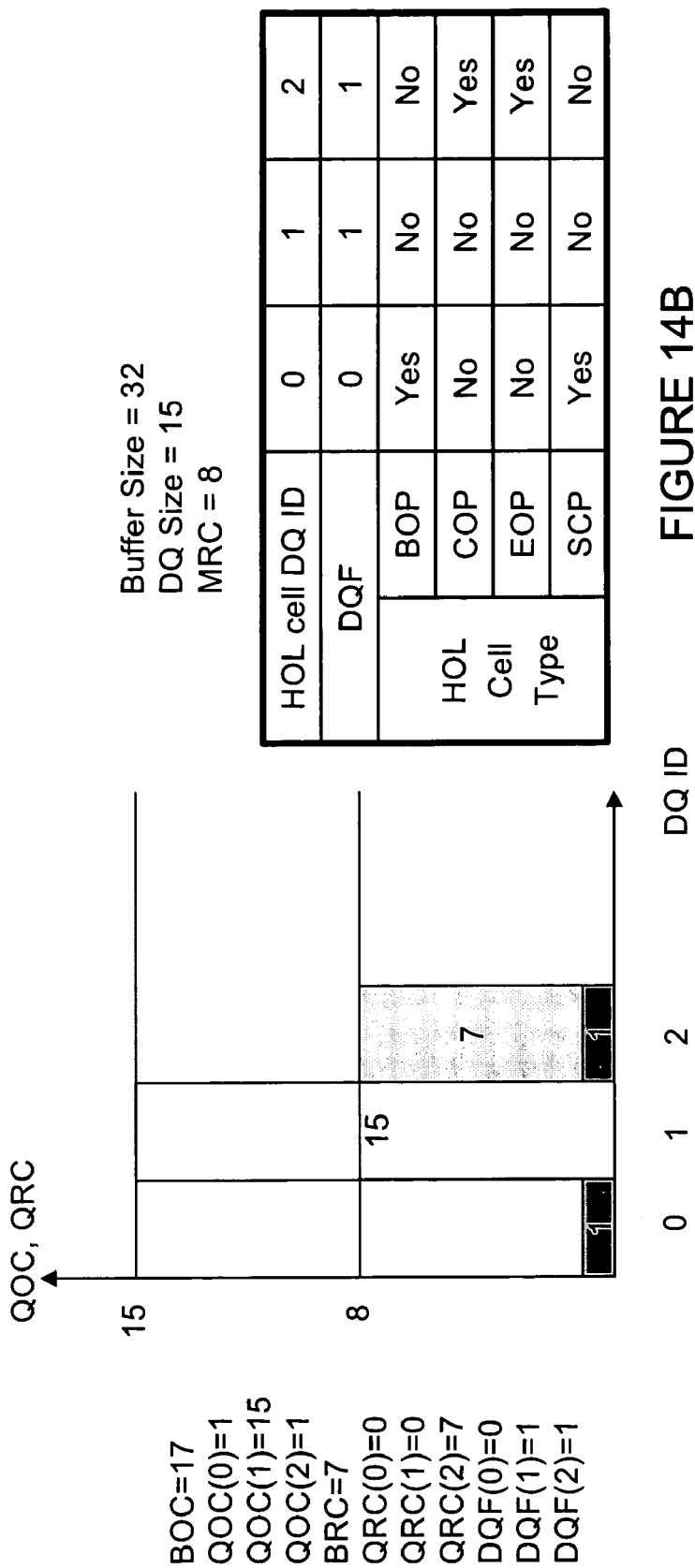
Figure 15:
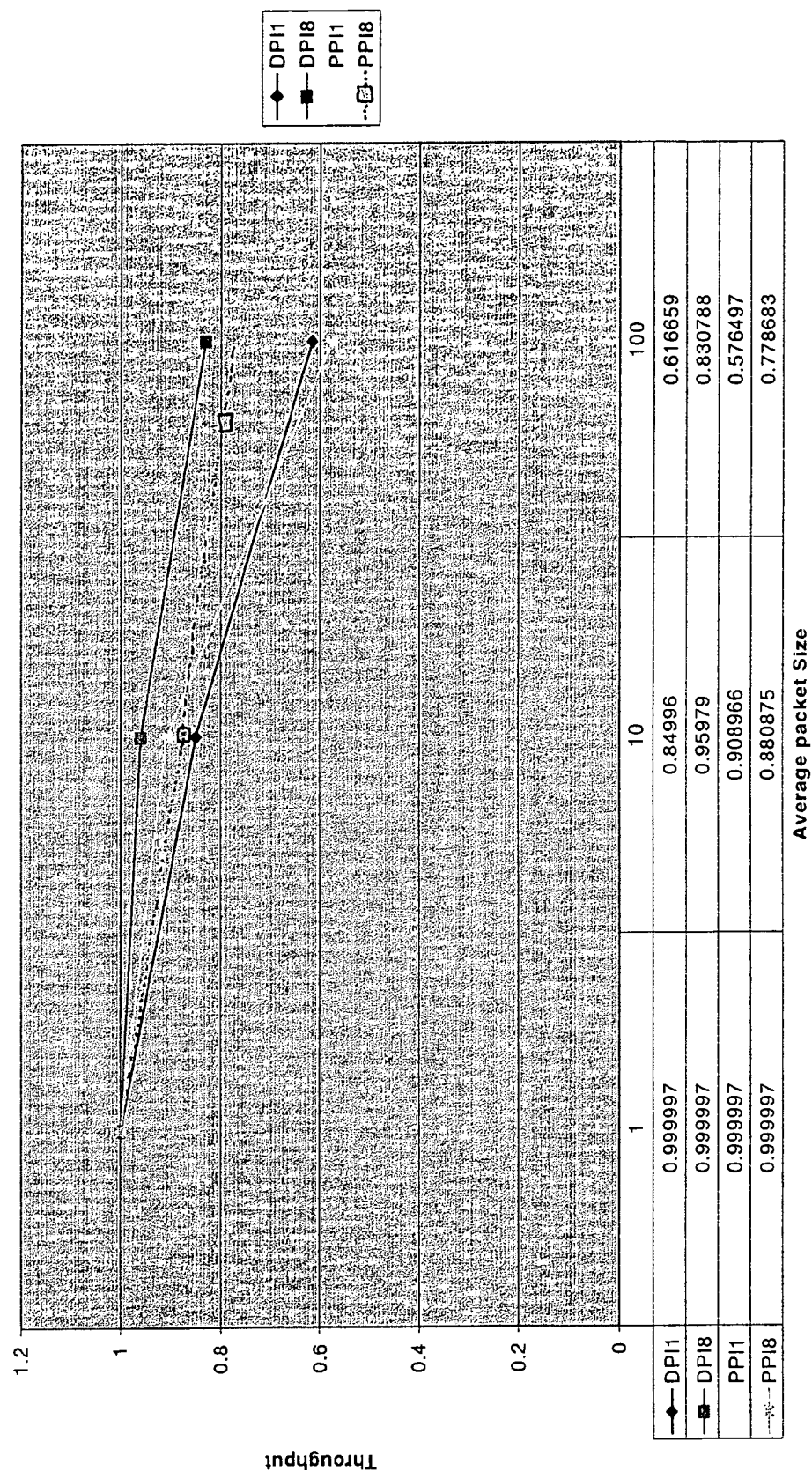

FIGS. 13*a*, 13*b*, 14*a* and 14*b* illustrate examples of HOL cell eligibility determinations when made consistent with the present invention FIG. 15 includes plots of throughput versus average packet size for various scheduling techniques.

§4. DETAILED DESCRIPTION

The present invention may involve novel methods, apparatus, message formats, and/or data structures for simplifying packet reassembly, while maintaining fairness and throughput and avoiding deadlock. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

The following list includes letter symbols that may be used in this application.

N: switch size, which is number of ports in the system (N=n*k)

M: buffer size

R: number of reassembly queues in each TME n: module size, which is the number of inputs at the IM or the number of outputs at the OM m: number of CMs k: number of IMs/OMs p: number of planes q: number of priorities u: hot spot probability v: heavy flow probability l: average packet size in cells d1: distance between the TM and IM/OM in units of cell slot d2: distance between the IM/OM and CM in units of cell slot f1: number of normal flows (e.g., 100,000)

f2: number of heavy flows (e.g., 10)

Q_sm: Queue size in SM (e.g., 15)

B_sm: Buffer size in SM (e.g., 32)

Q_voq: VOQ size in TMI (e.g., 1023 cells)

Q_raq: RAQ size in TME (e.g., 255 cells)

B_tmi: Buffer size in TMI (e.g., 2 million cells)

B_tme: Buffer size in TME (e.g., 2 million cells)

The following list includes acronyms that may be used in this application.

| | |
|---|---|
| AP: | Acknowledgement Period |
| ASIC: | Application Specific Integrated Circuit |
| ATM: | Asynchronous Transfer Mode |
| BOC: | Buffer Outstanding Cell counter |
| BOP: | Beginning Of Packet cell |
| BRC: | Buffer Reserved Cell counter |
| CAM: | Content Addressable Memory |
| CI: | Cell Interleaving |
| CM: | Center Module |
| COP: | Continue Of Packet |
| CPI: | Complete Packet Interleaving |
| COSQ: | Class Of Service Queue |
| CR: | Core Router |
| CRC: | Cyclic Redundancy Check |
| CRT: | CRediT update |
| CTYPE: | Cell TYPE |
| DEST: | DESTination |
| DPI: | Dynamic Packet Interleaving |
| DQ: | Destination Queue |
| DQC: | DQ Counter |
| DQF: | DQ Flag |
| EOP: | End Of Packet |
| FGID: | Flow Group ID |
| FID: | Flow ID |
| FIFO: | First In First Out queue |
| FR: | FRamer |
| Gbps: | Giga bits per second (i.e., $10^9$ bps) |
| HEC: | Header Error detection and Correction |
| HOL: | Head Of Line |
| ID: | IDentification |
| IM: | Input Module |
| IP: | Internet Protocol |
| LC: | Line Card |
| LOC: | Link Outstanding Cell |
| Mbits: | Mega bits |
| MHQ: | Multicast High-priority Queue |
| MLQ: | Multicast Low-priority Queue |
| MPLS: | Multi-Protocol Label Switching |
| MRC: | Maximum number of Reserved Cells |
| NP: | Network Processor |
| OM: | Output Module |
| OPC: | Outstanding Packet Counter |
| OXC: | Optical Cross-connect System |
| PACK: | Packet ACKnowledgment |
| Pbps: | Peta bits per second (i.e., $10^{15}$ bps) |
| PID: | Path ID |
| POS: | Packet Over SONET |
| PPI: | Partial Packet Interleaving |
| QOC: | Queue Outstanding Cell counter |
| QRC: | Queue Reserved Cell counter |
| RAQ: | ReAssembly Queue |
| ROC: | RTT Outstanding Cell counter |
| RR: | Round Robin |
| RTT: | Round-Trip Time |
| SCP: | Single Cell Packet cell |
| SM: | Switch Module |
| SQ: | Source Queue |
| Tbps: | Tera bits per second (i.e., $10^{12}$ bps) |
| TM: | Traffic Manager module |
| TMI: | Ingress TM |
| TME: | Egress TM |
| TP: | TransPonder |
| TS: | Time Slot |
| UHQ: | Unicast High-priority Queue |
| ULQ: | Unicast Low-priority Queue |
| VC: | Virtual Clock |
| VOQ: | Virtual Output Queue |
| VPQ: | Virtual Path Queue |
| WFQ: | Weighted Fair Queuing |
| WRED: | Weighted Random Early Discard |
| WRR: | Weighted Round Robin |

§ 4.1 Packet Reassembly Using Packet Interleaving Such as Dynamic Packet Interleaving To simplify reassembly in the multi-plane, multi-stage switch fabric, some form of packet interleaving (e.g., CPI, PPI or DPI) may be performed instead of cell interleaving (e.g., CCI) throughout stages (e.g., every stage) of the switch fabric. That is, if more than one packet is contending for the same output link in the switch module, the arbiter gives priority to a cell of a packet for which at least one cell has already been sent to the output link. As a result, the number of reassembly queues is dramatically reduced to the number of paths multiplied by the number of scheduling priorities, and is independent of the switch size. These schemes are referred to as the packet interleaving scheduling schemes. Three different packet interleaving scheduling schemes are now described.

One way to prevent the out-of-sequence problem is to schedule "complete packets" in a round-robin manner as shown in FIG. 5. This scheduling scheme, referred to as complete packet interleaving (CPI) below, achieves cell sequence integrity. That is, the arbiter doesn't change its pointer until it sees the end of the packet (i.e., until the entire packet has been sent). However, the throughput of the CPI scheduling scheme may be degraded when a large packet arrives at the switch fabric because the large packet may hold the output link for a long time even if the SQ from which the large packet is coming becomes empty (e.g., while waiting for more cells of the large packet). Moreover, CPI may cause throughput degradation. For example, referring to FIG. 5, notice that the DQ(Z) can be idle while the A and B packets are being transmitted. CPI requires the complete transmission of a whole packet to the DQ before sending another packet to the same DQ.

Another scheduling scheme, referred to as partial packet interleaving (PPI), is the same as the CPI scheme except that the arbiter may update its pointer when the SQ is empty or the DQ is full. The PPI scheme maintains a DQ flag for each DQ so that no more than one packet is sent to the DQ when the DQ holds a partial packet.

Dynamic packet interleaving (DPI) scheduling schemes may be used at one or more of the output links of the TMI, IM, CM, and OM. FIG. 6 shows an example of how packets are interleaved and transmitted with DPI. As FIG. 6 shows, the packet in SQ A has the same destination as the packet in SQ B. However, since the packet in SQ C is destined for a different DQ (DQ Z) than the packet in SQ A, its cells can be interleaved with those cells of a packet in SQ A. In other words, cells of packets destined for different DQs can be interleaved, but cells of packets destined for the same DQ cannot be interleaved. To fairly serve the packets and maximize the throughput of the next switch module, cells of different packets destined for different DQs may be served in a round-robin manner. As a result, there will often be more DQs in the next stage that have cells to be transmitted to the following stage. For example, comparing CPI of FIG. 5 with DPI of FIG. 6 at the end of a $5^{th}$ cell time slot, in CPI, only DQ X will have cells, but with DPI, both DQ X and DQ Z will have cells. In other words, since there will be more cells traversing through the stages, overall throughput will be improved.

In the DPI scheduling scheme, the arbiter chooses cells in round robin fashion among the non-empty SQs while maintaining DQ flags. A DQ flag for each DQ is used to ensure that no more than one packet can send to the same DQ when the DQ holds a partial packet. However, cells destined for different DQs whose flags aren't set may be interleaved with each other.

Table 1 shows the number of reassembly queues at the TME required to ensure reassembly for the four scheduling schemes described in this application. The required number of reassembly queues in the CCI scheme is p*q*m*n*k. In the CPI scheme, only one reassembly queue per plane per priority is necessary. For example, if p=8, q=2, and n=m=k=64, the CCI scheme requires 4 million queues while the CPI scheme only 16 queues. The PPI and DPI schemes require a reasonable number of reassembly queues, though more than CPI. However, their throughputs are better than that of CPI.

TABLE 1

| Scheduling Scheme | Number of Reassembly Queues | p = 8, q = 2, n = m = k = 64 |
| --- | --- | --- |
| Complete Cell Interleaving (CCI) | p * q * m * n * k | 4,194,304 |
| Partial Packet Interleaving (PPI) or Dynamic Packet Interleaving (DPI) | p * q * m | 1024 |
| Complete Packet Interleaving (CPI) | p * q | 16 |

§ 4.1.1 Implementation of Packet Interleaving Schemes Such as CPI, PPI and DPI

In the following examples, the counter is counting the outstanding number of cells for each destination queue (DQ). The round robin (RR) pointer is an index indicating the starting source queue (SQ).

Figure 1:
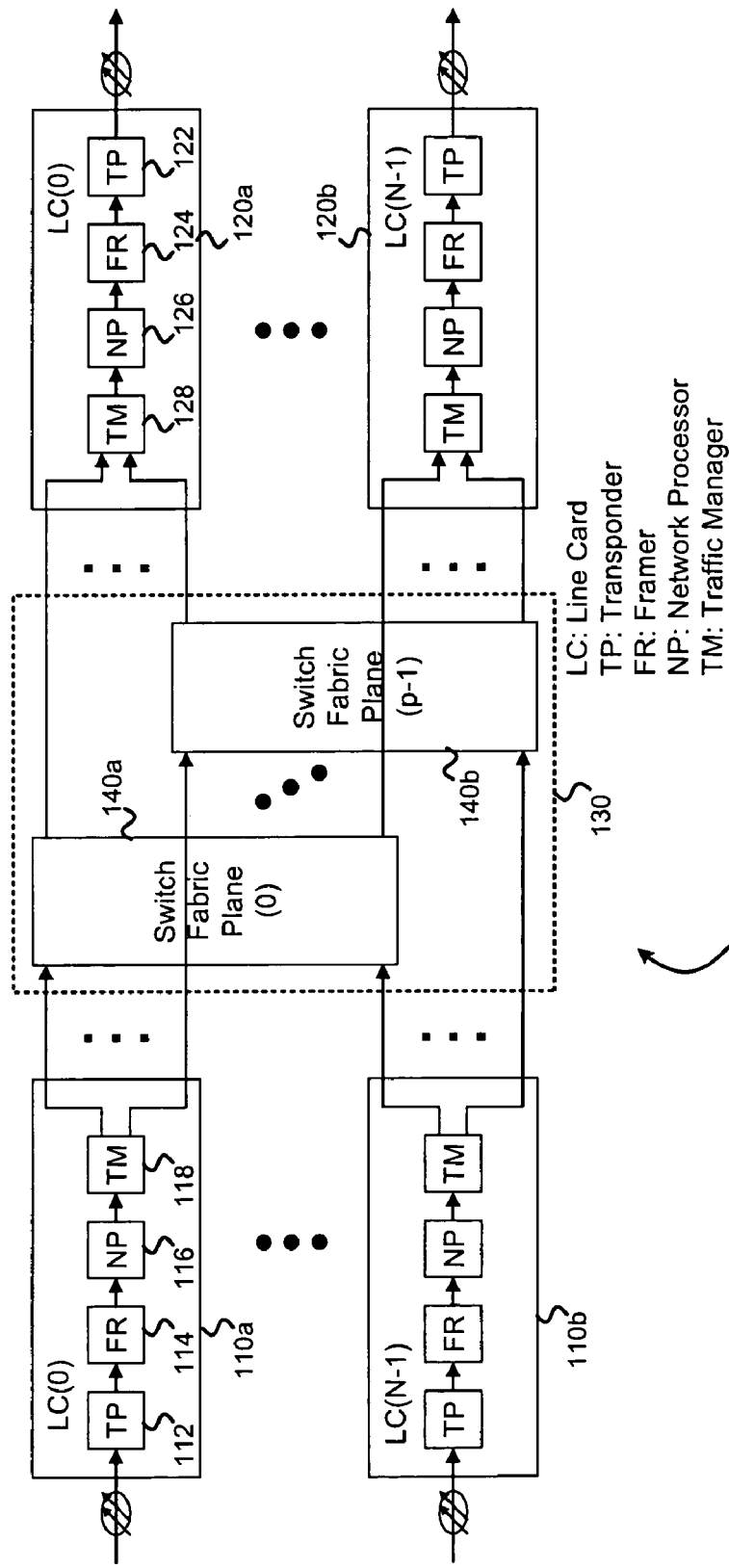
FIG. 1 is a block diagram of an exemplary switch environment in which, or with which, the present invention may be used.
Figure 2:
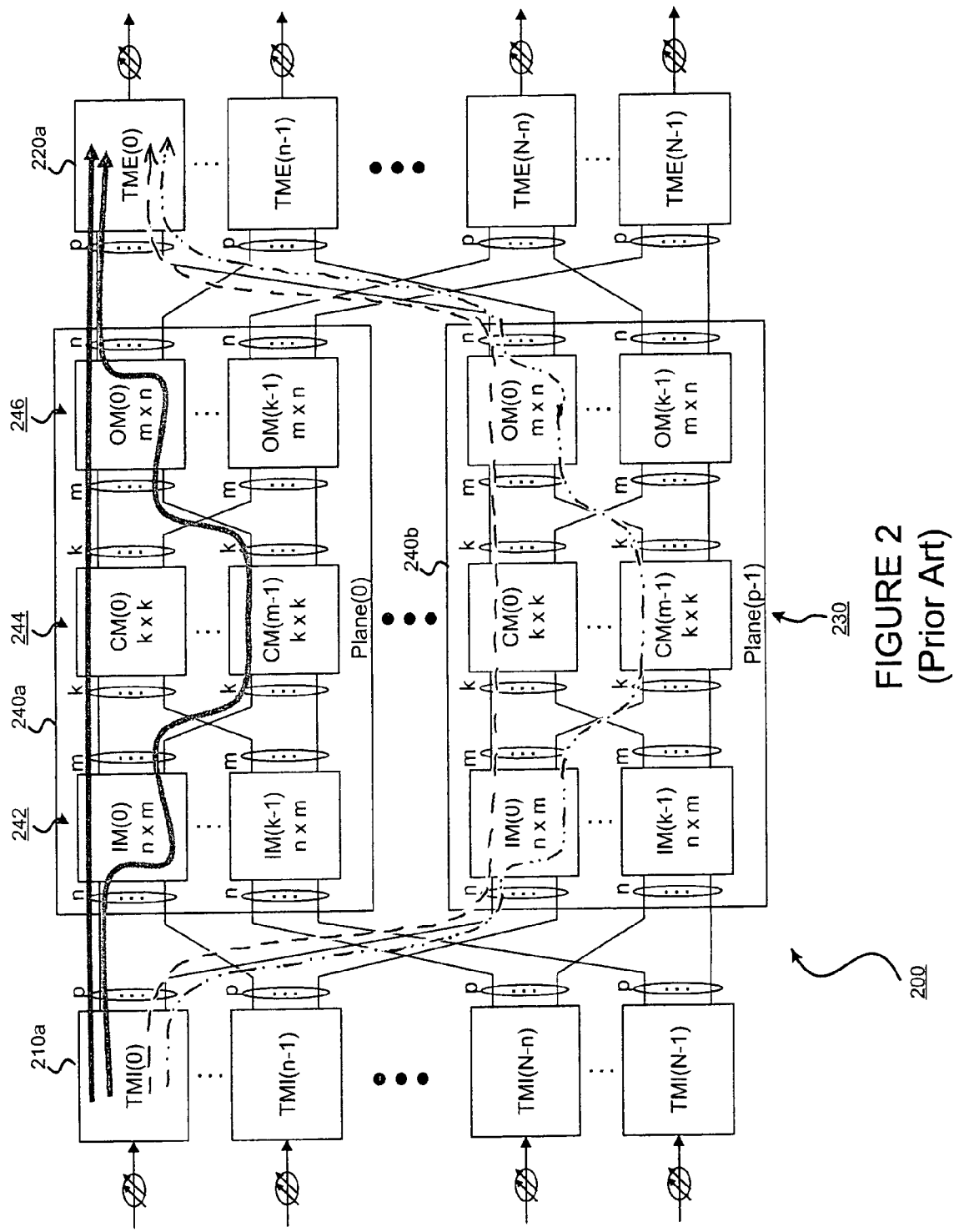
FIG. 2 illustrates alternative paths for a given {input port, output port} pair through a multi-stage switch.
Figure 4:
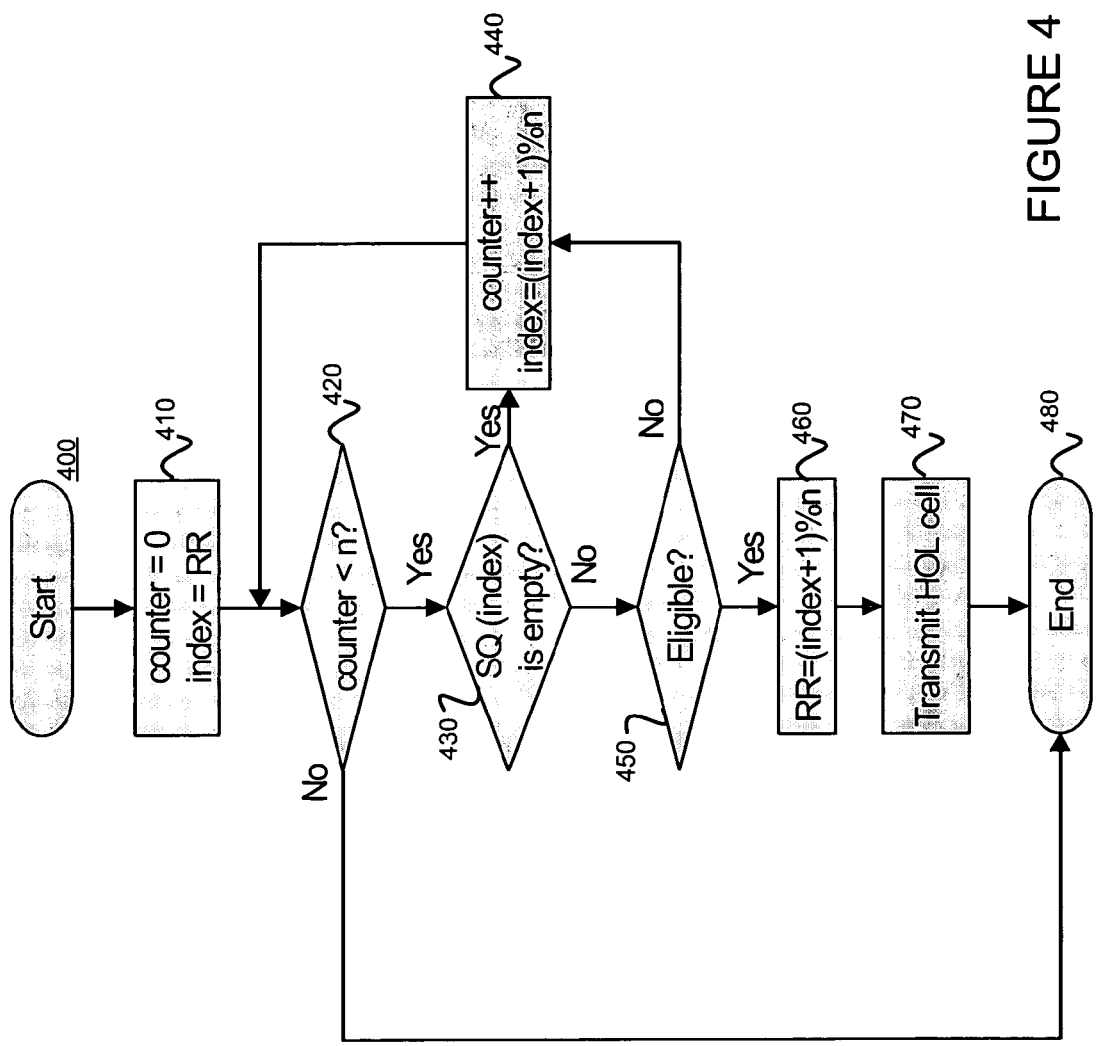
FIG. 4 is a flow diagram of an exemplary method that may be used to perform complete cell interleaving scheduling in a manner consistent with the present invention.
Figure 7:
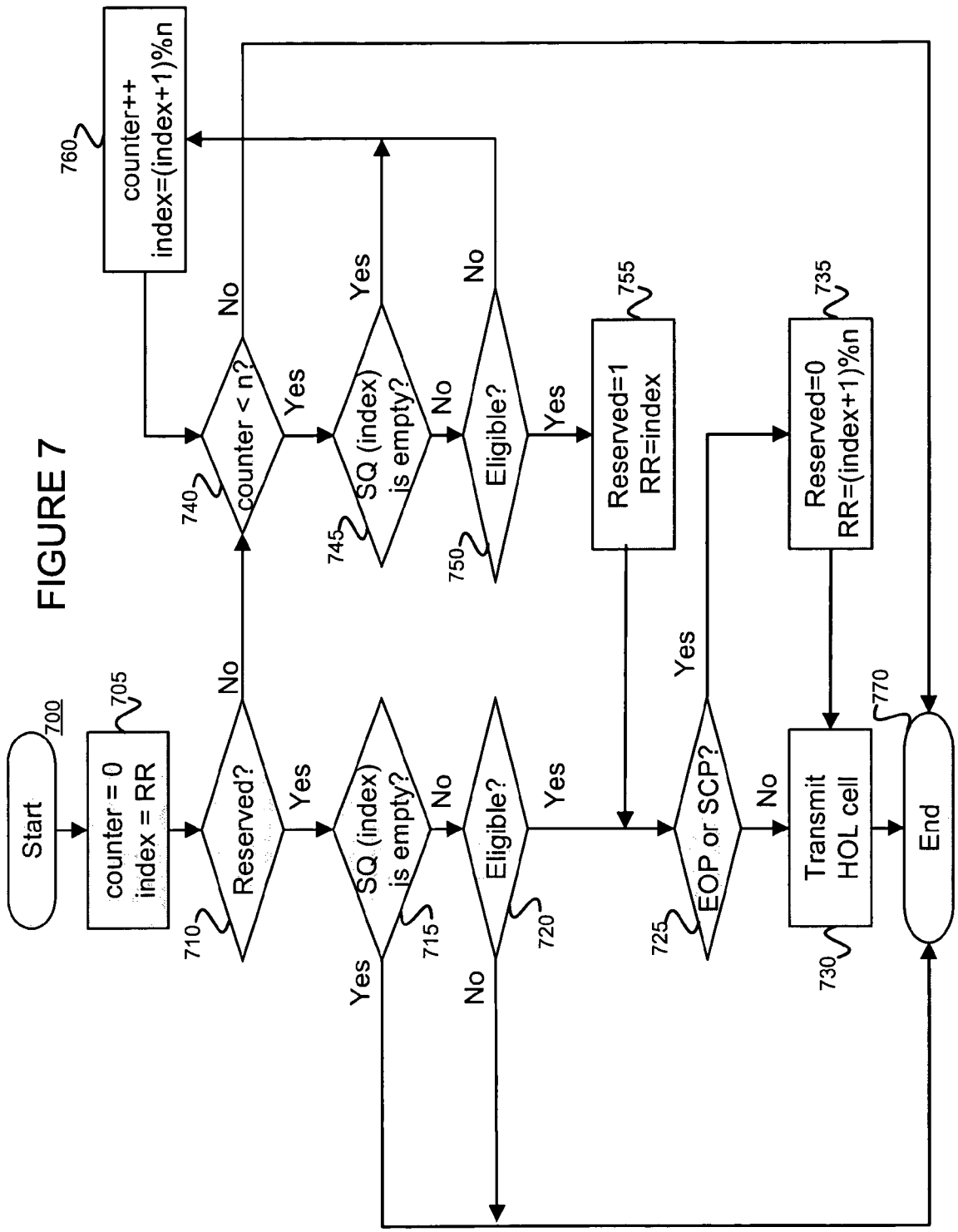
FIG. 7 is a flow diagram of an exemplary method that may be used to perform complete packet interleaving scheduling in a manner consistent with the present invention.

FIG. 7 is a flow diagram of an exemplary arbitration method 700 that may be used to perform (CPI) scheduling. The method 700 can be performed for each DQ. A counter is initialized (e.g., set to 0) and an index is set to the round robin pointer (RR). (Block 705) The method 700 determines whether or not there is a partial packet on the link. This may be determined using a one-bit flag (i.e., Reserved bit). (Block 710) If there is a partial packet on the link, the link will be "reserved" and only the SQ indicated by the RR pointer can send a cell through the link. The method 700 then determines whether the SQ indicated by the RR pointer is empty. (Block 715) If that SQ is empty, the link does not send any other cell. (Return node 770) The method 700 waits until the SQ receives the EOP cell. If, on the other hand, the SQ indicated by the RR pointer is not empty, if the HOL cell is "eligible", it is transmitted. (Blocks 720 and 730.) An example of an HOL cell eligibility determination is provided in § 4.2.1 below. After the link sends an EOP cell or a SCP, the link is released (reserved set to "NO"), the RR pointer is updated and a new packet (e.g., in another SQ) can begin to send cells. (Blocks 725, 735)

Referring back to 710, if the link is not reserved (no partial packet was sent and stored at the DQ), the SQ is selected in a round-robin manner beginning from the SQ indicated by the RR pointer. (Blocks 740, 745, 750, 755, 760) More specifically, it is determined whether the SQ indicated by the updated RR pointer is empty. (Block 745) If the queue is not empty, and if the HOL cell is eligible (Block 750) the queue reserves the link (Block 755) and the method 700 continues at Block 725. As was the case above, if the cell type of the cell just transmitted is BOP or COP, the RR pointer is not changed. (Blocks 725, 730) If, on the other hand, the cell just transmitted is an EOP or SCP, the RR pointer is moved to the next SQ. (Blocks 725, 735)

In the exemplary CPI scheme in which an instance of the method 700 is performed for each DQ, since cells coming from different input ports are not interleaved at all, cells belonging to the same packet arrive at the TME back-to-back, without any intervening cells from another packet, until the EOP cell is sent. Therefore, each TME needs only p*q reassembly queues; one per plane-priority level combination. The CPI scheme is attractive from the perspective of reassembly but experiences performance degradation when there are large packets in the switch fabric. For example, if a jumbo packet (e.g., 9 KB) is in the switch fabric, all other packets sharing the same link with the jumbo packet have to wait until the jumbo packet finishes its transmission. The blocked HOL packets waiting for the link reserved in the jumbo packet may block packets behind them, even if such blocked packets are destined for an idle link. Thus, the CPI scheme can degrade the throughput of the switch fabric. To summarize, the CCI scheme is attractive from the perspective of load-balancing and the CPI scheme is attractive from the perspective of reassembly.

Figure 8:
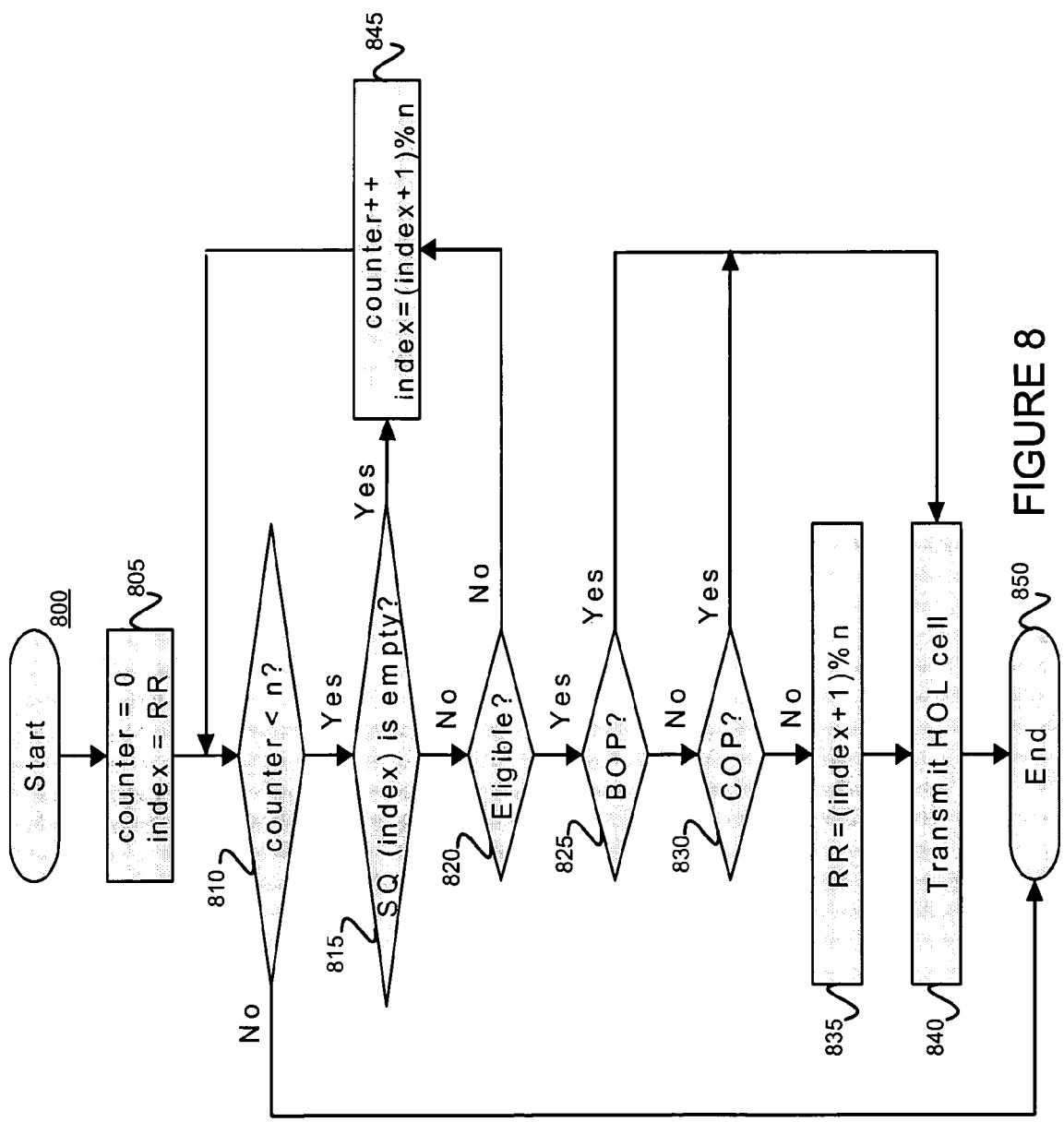
FIG. 8 is a flow diagram of an exemplary method that may be used to perform partial packet interleaving scheduling in a manner consistent with the present invention.

The PPI scheduling scheme has the advantage of good load balancing like the CCI scheme and the advantage of reduced reassembly queues like the CPI scheme. FIG. 8 is a flow diagram of an exemplary method 800 that may be used to perform PPI scheduling. A counter is initialized (e.g., set to 0) and an index is set to the RR pointer. (Block 805) The arbiter scans n (e.g., 256) SQs beginning from the queue indicated by the RR pointer. It is determined whether or not the SQ indicated by the RR pointer is empty. (Block 815) If the SQ is empty, the next SQ is examined. (Block 845) If, on the other hand, the SQ is not empty, the eligibility of the HOL cell is examined. (Block 820) Exemplary eligibility determinations are described in § 4.2.1 below. If it is not eligible, the next SQ is examined. (Block 845) If the HOL cell is eligible, it is sent to the DQ. (Block 840) The RR pointer is updated only if the cell type of the transmitted cell is EOP or SCP so that the entire packet is sent. (Blocks 825, 830, 835)

The PPI scheme performs well under non-uniform traffic. However, as with CPI, its throughput is degraded if the packet size becomes large. This is because it is a blocking network if n=m=k. If m=2*n=2*k, the throughput is improved but the cost is increased (the number of center modules is doubled), too.

Figure 9:
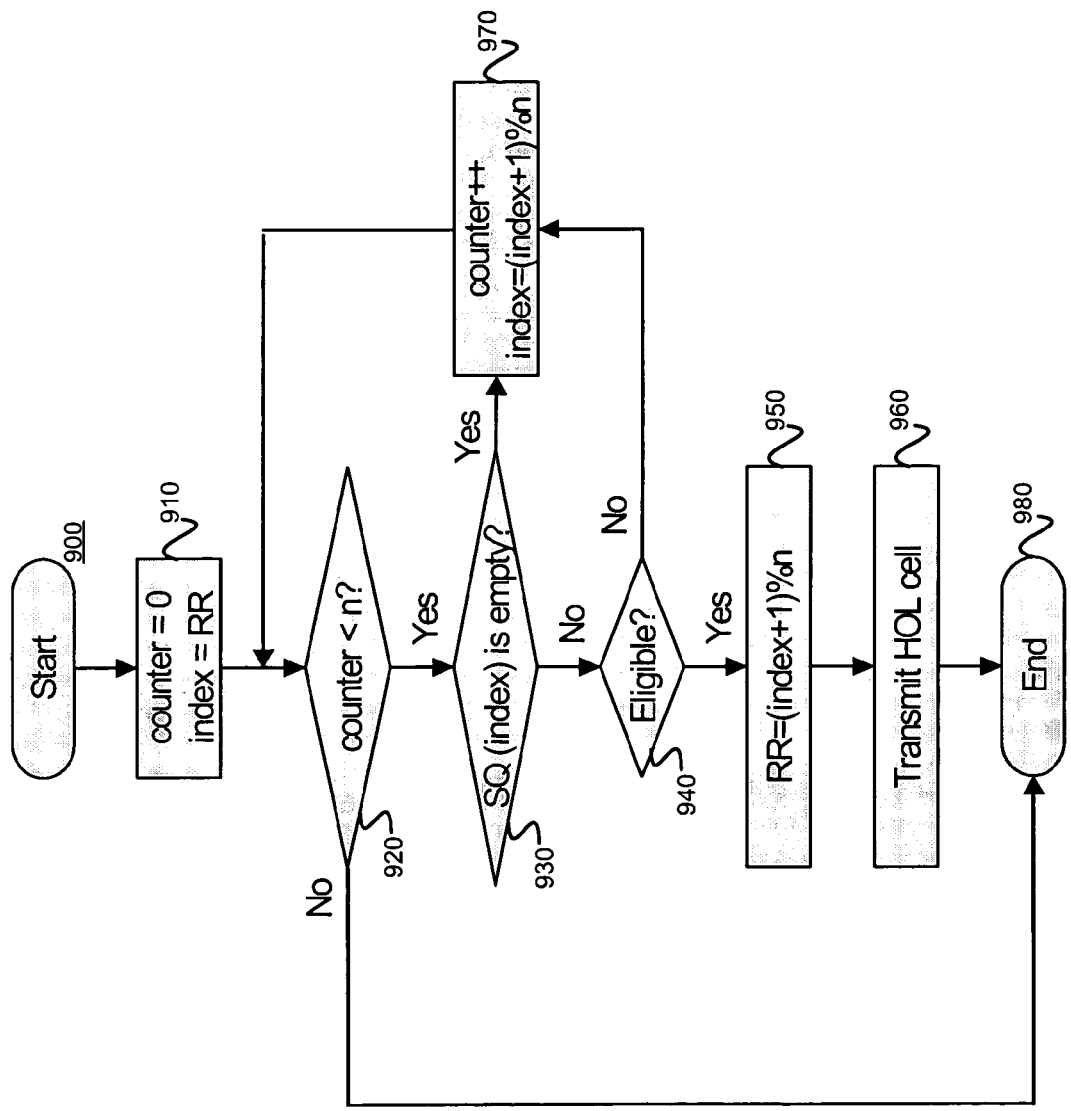
FIG. 9 is a flow diagram of an exemplary method that may be used to perform dynamic packet interleaving scheduling in a manner consistent with the present invention.

The DPI scheduling scheme is similar to the PPI scheme except for RR pointer updates. FIG. 9 is a flow diagram of an exemplary method 900 that may be used to perform DPI scheduling. A counter is initialized (e.g., set to zero) and an index is set to the RR pointer. (Block 910) The arbiter scans SQs beginning from the queue indicated by the RR pointer. (Blocks 920, 930, 970) More specifically, it is determined whether or not the SQ indicated by the RR pointer is empty. (Block 930) If the SQ indicated by the RR pointed is empty, the index is incremented (Block 970) and the method 900 continues to block 920. If, on the other hand, the SQ is not empty, the eligibility of the HOL cell is examined (Block 940). If the HOL cell is not eligible, the next SQ will be examined (Blocks 970, 920, 930). If, on the other hand, the HOL cell it is eligible, the RR pointer is updated and the cell is sent to the DQ. (Blocks 950 and 960) Note that in the DPI scheme, the RR pointer is updated whenever a cell is transmitted, regardless of the cell type of the transmitted cell. (Block 950)

Figure 10:
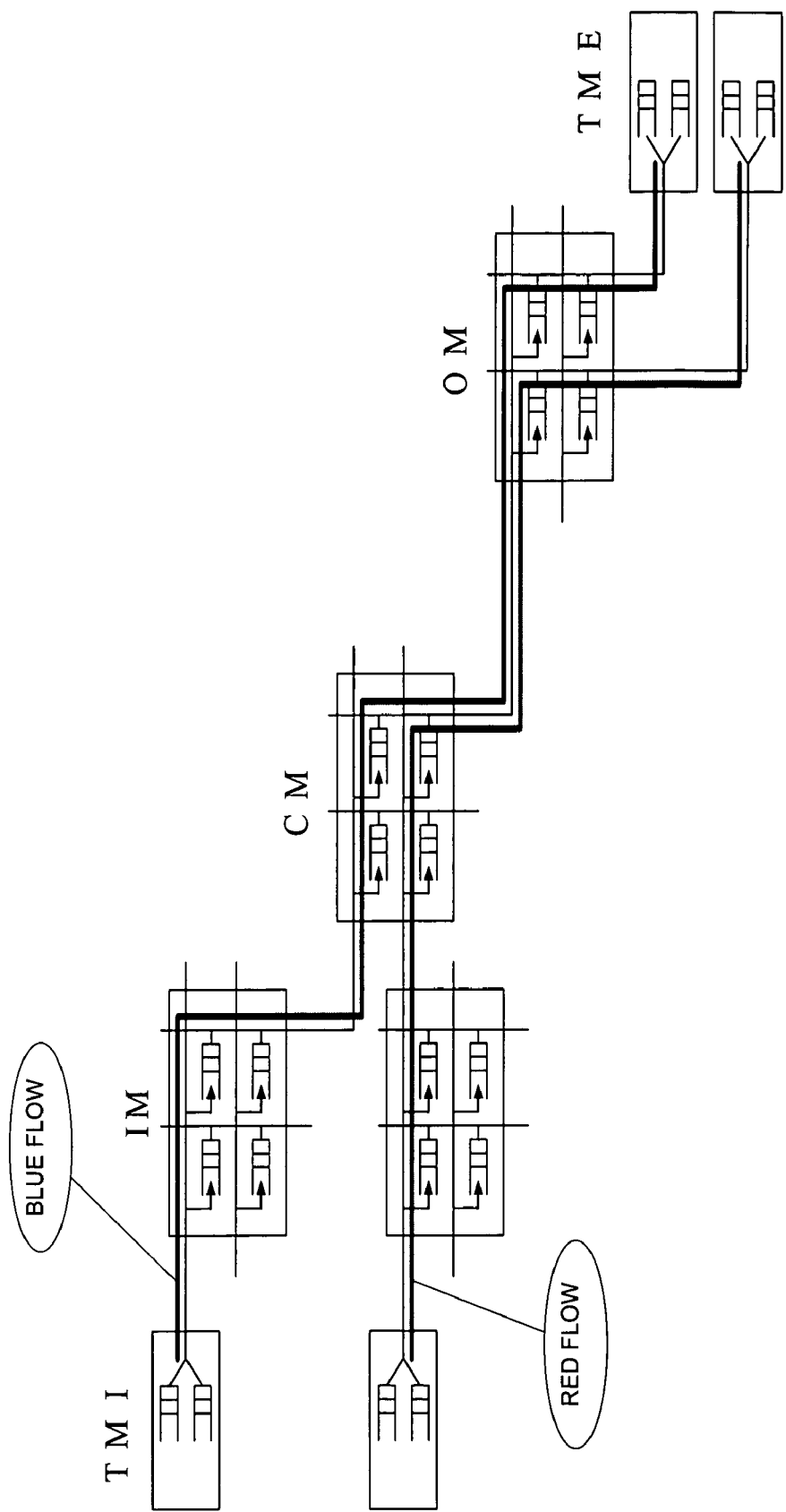
FIG. 10 is an example that illustrates how the DPI scheme performs better than the PPI scheme.

FIG. 10 is an example that illustrates how the DPI scheme performs better than the PPI scheme. The blue flow and the red flow contend for the output link of the CM. Assume that the blue flow comes before the red flow and the link sent at least one cell for the blue flow. In the PPI scheme, the red flow cannot send even one cell until the link sends the EOP cell of the blue flow. But in the DPI scheme, the two flows can take turns sending cells from both flows while maintaining the cell sequence integrity of both flows. Packet reassembly is not a problem because both packets are destined for different TME queues. Thus, DPI does not have throughput degradation such as that which may occur when large packets are sent using CPI or PPI.

§ 4.2 Deadlock Avoidance by Memory Reservation for a Partial Packet

The problem of deadlock, which may occur in packet interleaving schemes such as CPI or DPI, is introduced in § 4.2.1 below. Then, ways of avoiding deadlock, consistent with the present invention, are described in § 4.2.2 below.

§ 4.2.1 Deadlock

Packet interleaving in a multi-stage switch fabric can cause a deadlock problem. The following example illustrates the problem of deadlock. Assume that the BOP cell of a packet has been sent to a TME. However, the packet's EOP cell may remain at the TMI waiting to win arbitration since the TMI sends cells in round robin fashion among the cells destined for different CMs. When the EOP cell of the packet eventually wins arbitration, the buffer at IM (i.e., the DQ in this case) might be full (e.g., by other cells coming from different SQs). In such a case, the transmission of the EOP cell will be blocked to prevent buffer overflow. (Assuming that each of IM, CM, OM has a finite buffer size, a buffer overflow may happen. Buffer overflow can be avoided by implementing a credit-based flow control scheme across all links.) Moreover, the buffers at IM can be full of fresh packet cells (if a buffer contains a BOP cell, it is considered to. have a fresh packet) destined for the same TME as the one storing the BOP cell of the packet whose EOP is stuck at the TMI waiting for the IM buffer to make room for it. Such fresh packet cells at IM cannot be sent because of the EOP cell at the TMI. In the worst case, there can be a situation that all partial packets at the TMI are blocked due to the full buffers (DQs) at IM. Moreover, fresh packet cells at IM are blocked because of the partial packets. In such a scenario, no cells in the switch fabric can be sent. This is called a deadlock.

Figure 11:
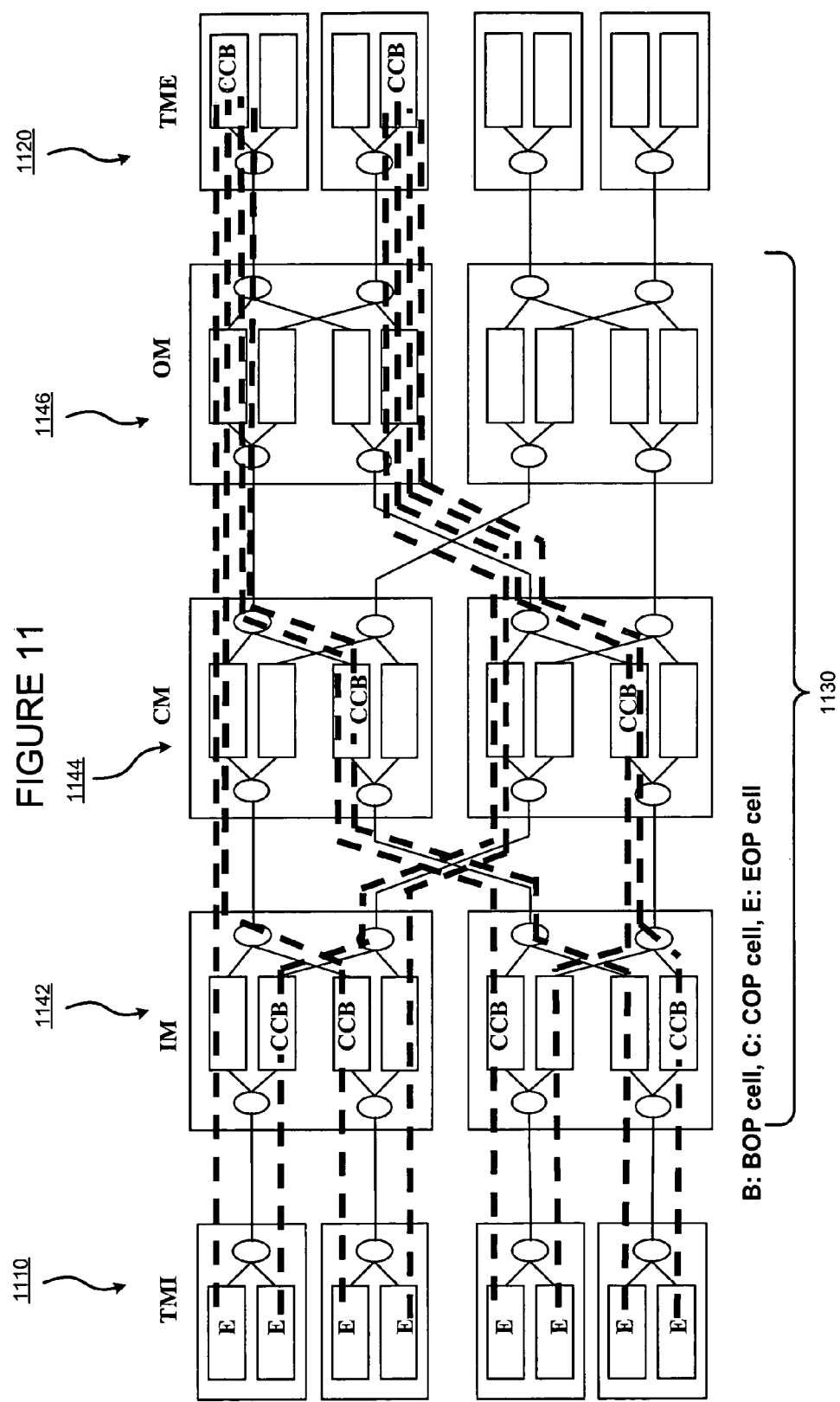
FIG. 11 is a diagram which illustrates the potential problem of deadlock in a multi-stage switch.

FIG. 11 shows an example of deadlock in a 4*4 system. There are four TMIs 1110 interconnected with four TMEs 1120 by a three-stage 2*2 crossbar switch fabric 1130. In this example, each of the IMs 1142, CMs 1144, and OMs 1146 have two inputs and two outputs. For simplicity, only one plane is shown. Each queue is illustrated as a landscape-oriented rectangular box. In all stages, two queues associated with the input link share the same buffer. Assume that the buffer size of each TMI 1110 and TME 1120 is big enough to hold the largest packet size (e.g., a 9-kB jumbo packet), but the buffer size of each of the IMs 1142, CMs 1144, and OMs 1146 is only three cells. Thus, up to three cells can be stored at the buffer in an IM, CM, and OM. In a queue, "C" denotes a COP cell, "E" denotes an EOP cell, and "B" denotes a BOP cell. In FIG. 11, each TMI 1110 has two flows—one flow destined for TME 1 and another flow destined for TME 2. TMI 1 sent three cells to TME 1 but the last cell (i.e., EOP cell) got stuck because the buffer at IM 1142 is full. TMI 2 sent three cells destined for TME 1 to IM, but they cannot be sent to CM because the output link of the IM is reserved for the flow from TMI 1 to TME 1. In the same way, all flows became stuck because either the output link is reserved for another flow, or the buffer at the next stage is full.

§ 4.2.2 Avoiding Deadlock

An eligibility test may be used to (i) avoid the interleaving of cells of different packets at a DQ, and (ii) to avoid deadlock.

The problem of deadlock, introduced in § 4.2.1 above, can be avoided if the buffer in which the DQs are defined reserves free memory space for a partial packet. When the memory space is reserved for the partial packet, the SQ may be empty. The reserved memory space can be filled when the SQ receives a cell from its upstream source. To avoid a deadlock situation, at least one cell space should be reserved in the receiver's buffer for all partial packets. Note that a receiver's buffer may include multiple DQs. For example, one buffer may consist of 64 DQs. In this way, a cell from any partial packet can be forwarded to the next stage and a deadlock situation is avoided. Since there are multiple (e.g., 4) links from TMI to TME, there are multiple (e.g., 4) sets of SQs and DQs. On each link, a cell can be forwarded if the memory space is reserved for the partial packet. For this purpose, a Queue Reserved Cell (QRC) counter may be used. In embodiments that use a QRC, the QRC is set to Maximum Reserved Cells (MRC) as soon as the first cell of a packet in its associated SQ is sent. Maximum Reserved Cells (MRC) is a constant that guarantees memory space in the DQ buffer for each partial packet. That is, QRC should be equal to or less than MRC. For example, if MRC=8, the QRC is set to 8 as soon as the BOP cell is granted and the QRC is set to 0 as soon as the EOP cell is granted. The QRC is decremented by one whenever the SQ sends a (COP) cell to the DQ. All counters, including QRC, may be maintained at the upstream SM. Although the QRC is not incremented, it can jump from any value (e.g., 0, 1, 2, . . . 7) to MRC(e.g., 8).

The notion of a queue outstanding cell counter (QOC) is introduced in the '733 provisional and in U.S. patent application Ser. No. 10/776,575 (incorporated herein by reference), titled "SWITCH MODULE MEMORY STRUCTURE AND PER-DESTINATION QUEUE FLOW CONTROL FOR USE IN A SWITCH", filed on Feb. 11, 2004 and listing Hung-Hsiang Jonathan Chao and Jinsoo Park as inventors. Briefly stated, QOC may be used to represent the sum of cells left in the DQ and any cells on the link that are destined for the DQ. If QOC of the DQ is larger than MRC, the QRC may be set to 0. Setting QRC to 0 prevents the reserved memory space for the DQ from exceeding the MRC. The QRC counts the number of cells allowed to be sent from the upstream SM to the DQ even when the downstream buffer has no space for any new fresh packet. Although the QRC becomes 0, the SQ can send more cells to the DQ if the buffer to which the DQ belongs has a free space. If the QOC is less than MRC and the DQF is equal to 1 (i.e., if the DQ is taken), the sum of QOC and QRC should always be equal to MRC. The DQF bit indicates if the DQ is taken or not. If the DQ is not taken (i.e., if DQF=0), there is no partial packet destined for the DQ and any BOP cell or SCP cell can be sent to the DQ. If, on the other hand, the DQ is taken (i.e., if DQF=1), there is an SQ that has a partial packet destined for that DQ and only that SQ can send a cell to the DQ. If the DQF is set to 1, a BOP cell or SCP cell should not be sent. Otherwise, if a BOP or SCP cell were sent, more than one packet would be interleaved and packet integrity would not be maintained in the DQ. To avoid this, no more than one packet is allowed to be interleaved for the DQ.

The Buffer Reserved Cell counter (BRC) is the sum of QRCs of all DQs in the buffer. By adding a buffer outstanding cell counter (BOC) and BRC, the memory space is reserved for the partial packet. When the partial packet arrives at the SQ, although the sum of the BOC and BRC is equal to the buffer size, the cell is eligible for transmission if the QRC is greater than 0.

§ 4.2.2.1 Eligibility of the Hol Cell

Figure 12:
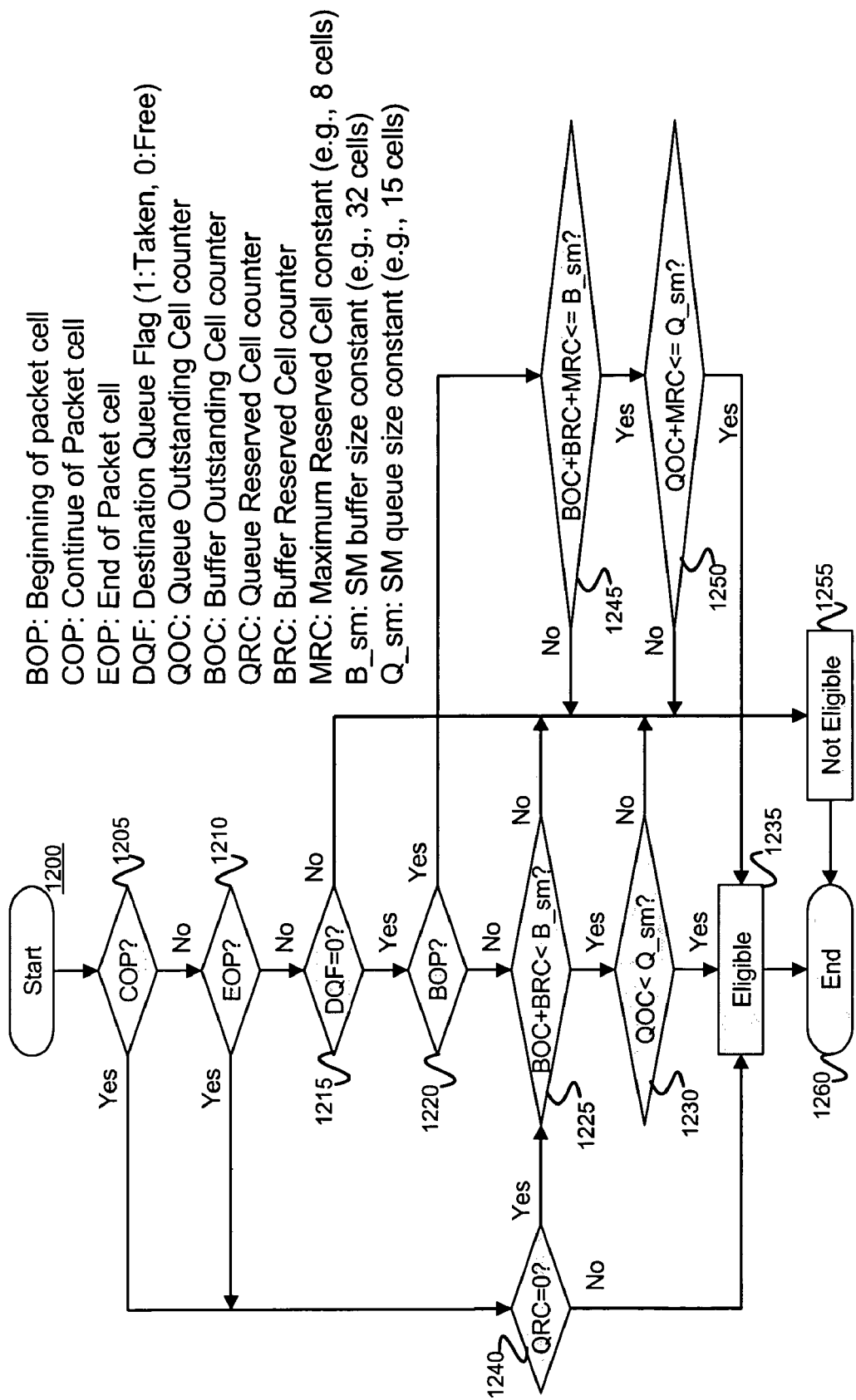
FIG. 12 is a flow diagram of an exemplary method that may be used to perform an eligibility determination in a manner consistent with the present invention.

Recall from blocks 720 and 750 of FIG. 7, block 820 of FIG. 8, and block 940 of FIG. 9, that before a cell is sent from an SQ, the eligibility of the HOL cell is checked. FIG. 12 is a flow diagram of an exemplary method 1200 that may be used to check HOL cell eligibility. The HOL cell is eligible if it meets any one of the following conditions:

The cell type is BOP, the DQ flag (DQF) is equal to 0, the sum of BOC, BRC, and MRC is not greater than the buffer size, and the sum of QOC and MRC is not greater than the DQ size (Blocks 1215, 1220, 1245, 1250, 1235), or The cell type is COP or EOP, and QRC is greater than 0 (Blocks 1205, 1210, 1240, and 1235), or The cell type is COP or EOP, the sum of BOC and BRC is less than the buffer size, and QOC is less than the DQ size (Blocks 1205, 1210, 1240, 1225, 1230, 1235), or The cell type is SCP, DQF is equal to 0, the sum of BOC and BRC is less than the buffer size, and QOC is less than the DQ size. (Blocks 1205, 1210, 1215, 1220, 1225, 1230, 1235).

Otherwise, the HOL cell is not eligible. (Block 1255).

If q=2, two buffers are associated with each link. That is, high priority cells can share one buffer and low priority cells can share another buffer. In at least some embodiments, cells with different priorities do not share the same memory space. The QOC can have a value between 0 and the SM queue size (Q_sm) (e.g., 15 cells). The BOC can have a value between 0 and the SM buffer size (B_sm) (e.g., 32 cells). The QRC can have a value between 0 and the MRC (e.g., 8 cells). For a DQ with a partial packet, only one SQ is eligible because the HOL cell of the SQ that sent a cell to the DQ should have a cell type of COP or EOP and the DQF should be set to 1. If the DQF is equal to 0, any BOP or SCP cell destined for the DQ is eligible. The sum of the BOC and BRC should be less than the buffer size (i.e., 32).

§ 4.2.2.1.1 Examples Illustrating Hol Cell Eligibility Determinations

FIGS. 13*a*, 13*b*, 14*a* and 14*b* illustrate examples of HOL cell eligibility determinations when made consistent with the present invention, in an exemplary embodiment in which the buffer size is 32 cells, the DQ size is 15 cells, and the MRC=8. In the tables in FIGS. 13*b* and 14*b*, "YES" means the HOL cell is eligible and "NO" means the HOL cell is not eligible.

FIGS. 13*a* and 13*b* show an example of the flow control mechanism. The buffer size is 32 cells and the DQ size is 15 cells. The reservation parameter is 8 cells. The sum of the BOC (i.e., 19 cells) and the BRC (i.e., 12 cells) is less than the buffer size (i.e., 32 cells). If the HOL cell is destined for the DQ(0), it is eligible only if its cell type is SCP. If the cell type is COP or EOP, the DQF should be equal to 1. If the cell type is BOP, the sum of BOC and BRC should be equal to or smaller than 24. If the HOL cell is destined for the DQ(1), DQ(2), or DQ(3), it is eligible if its cell type is COP or EOP because the DQF is equal to 1.

FIGS. 14*a* and 14*b* show another example of the flow control mechanism. If the HOL cell of the SQ is destined for DQ(O) and its cell type is BOP, it is eligible for transmission because there is enough space in the DQ. However, if it is destined for DQ(1), it cannot be transmitted because the DQ is full.

§ 4.3 Performance of DPI

The sizes of packets used in the Internet vary widely. (See, e.g., the Cooperative Association for Internet Data Analysis at www.CAIDA.org.) One of the most popular ways to simulate the variable packet size is geometric distribution. In a simulation, the average packet size is assumed to be 10 cells, with a maximum packet size of 192 cells. If the average packet size is smaller, the performance improves. In the Internet, the average packet size is about 280 bytes (i.e., 5 cells) and the maximum packet size is 9000 bytes (i.e., 161 cells).

FIG. 15 shows the throughput performance of PPI scheme of FIG. 9 and DPI scheme of FIG. 9 under bursty traffic. DPI1 is the DPI scheme with MRC of 1 cell and DPI8 with MRC of 8 cells. It is observed that DPI8 performs best among the four schemes. However, it is possible to engineer the MRC value using an external interface so the user can set the MRC value.

What is claimed is:

1. For use in a system having a source module with a plurality of source queues, each of the source queues for storing one or more cells of one or more packets, a destination module with a plurality of destination queues, each of the destination queues for storing one or more cells of one or more packets, and a multistage link between the source module and the destination module, a method for scheduling the communication of cells over the link comprising:

determining a non-empty source queue to grant access to the link at a given time;

determining whether to transmit a head-of-line cell of the determined non-empty source queue wherein the determination is to transmit the-head-of line cell if the transmission of cells from the same packet would only be interleaved with cells of packets destined for different destination queues and the head-of-line cell is a beginning-of-packet cell, and a buffer has sufficient space for all of the cells stored in the plurality of destination queues, cells on the multistage link, and cells of partial packets in the plurality of source queues, and wherein the determination is not to transmit the-head-of line cell if the transmission of cells from the same packet would be interleaved with the transmission of cells of different packets destined for the same destination queue;

if it is determined to transmit the head-of-line cell of the determined non-empty source queue, then transmitting the-head-of line cell.

2. The method of claim 1 wherein if it is determined not to transmit the head-of-line cell of the determined non-empty source queue, then determining a next non-empty source queue to grant access to the link using a round-robin scheduling.

3. The method of claim 2 wherein the act of determining a next, non-empty source queue to grant access to the link uses round-robin scheduling.

4. The method of claim 1 wherein if the head-of line cell is transmitted, then a next non-empty source queue to grant access to the link is determined.

5. The method of claim 1 wherein if the head-of-line cell is transmitted and the head-of-line cell is an end-of-packet cell, then a next non-empty source queue to grant access to the link is determined.

6. The method of claim 1 wherein if the head-of-line cell is transmitted and the head-of-line cell is a single-cell-packet cell, then a next non-empty source queue to grant access to the link is determined.

7. The method of claim 1 wherein if the head-of-line cell is transmitted and the head-of-line cell is either an end-of-packet cell or a single-cell-packet cell, then a next non-empty source queue to grant access to the link is determined, but otherwise, the same source queue will continue to have access to the link.

8. The method of claim 1 wherein the act of determining whether to transmit a head-of-line cell of the determined non-empty source queue includes determining whether or not the head-of-line cell is eligible for transmission, wherein if the head-of-line cell is determined to be eligible for transmission, then transmitting the head-of-line cell, and wherein if the head-of-line cell is not determined to be eligible for transmission, then not transmitting the head-of-line cell.

9. The method of claim 1 wherein the source module and the destination module are provided in a multi-plane, multi-stage switch having p planes, m central modules, and supporting q priorities, and wherein an egress traffic manager module needs only p*m*q reassembly queues to ensure packet reassembly.

10. The method of claim 1 wherein the source module and the destination module are provided in a multi-plane, multi-stage switch having p planes and m central modules and wherein an egress traffic manager module needs only p*m reassembly queues to ensure packet reassembly.

11. The method of claim 8 wherein the act of determining whether or not the head-of-line cell is eligible is used to reserve memory space in a buffer in which the destination queue is defined, for one or more partial packets stored in the destination queues.

12. The method of claim 8 wherein the head-of-line cell is determined to be eligible if:
the head-of-line cell is a beginning-of-packet cell;
the destination queue is not storing cells of another packet;
a sum of a buffer outstanding cell count, a buffer reserved cell count-and-a maximum reserved cell constant is not greater than a size of a buffer in which the destination queue is defined, and
a sum of a queue outstanding cell counter and the maximum reserved cell constant is not greater than a size of the destination queue.

13. The method of claim 8 wherein the head-of-line cell is determined to be eligible if:
the head-of-line cell is one of a continue-of-packet cell and an end-of-packet cell, and
a queue reserved cell count is greater than zero.

14. The method of claim 8 wherein the head-of-line cell is determined to be eligible if:
the head-of-line cell is one of a continue-of-packet cell and an end-of-packet cell,
a sum of a buffer outstanding cell count and a buffer reserved cell count is less than a size of a buffer in which the destination queue is defined, and
a queue outstanding cell count is less than a size of the destination queue.

15. The method of claim 8 wherein the head-of-line cell is determined to be eligible if:
the head-of-line cell is a single-cell-packet cell
the destination queue is not storing cells of another packet
a sum of a buffer outstanding cell count and a buffer reserved cell count is less than a size of a buffer in which the destination queue is defined, and
a queue outstanding cell count is less than a size of the destination queue.

16. For use in a system having a source module with a plurality of source queues, each of the source queues for storing one or more cells of one or more packets, a destination module with a plurality of destination queues, each of the destination queues for storing one or more cells of one or more packets, and at least a first multi-stage link between the source module and the destination module, a scheduler comprising:
means for determining a non-empty source queue to grant access to the at least a first link at a given time;
means for determining whether to transmit a head-of-line cell of the determined non-empty source queue wherein the determination is to transmit the-head-of line cell when the transmission of cells from the same packet would only be interleaved with cells of packets destined for different destination queues and the head-of-line cell is a beginning-of-packet cell, and a buffer has sufficient space for all cells stored in the plurality of destination queues, cells on the multi-stage link, and cells of partial packets in the plurality of source queues, and
wherein the determination is not to transmit the-head-of line cell when the transmission of cells from the same packet would be interleaved with the transmission of cells of different packets destined for the same destination queue; and
means for transmitting the-head-of line cell only if it is determined to transmit the head-of-line cell of the determined non-empty source queue, wherein the means for determining a non-empty source queue determines a next, non-empty source queue to grant access to the link if it is determined not to transmit the head-of-line cell of the determined non-empty source queue.

17. The scheduler of claim 16 wherein the means for determining a non-empty source queue to grant access to the link at a given time uses round-robin scheduling.

18. The scheduler of claim 17 wherein the means for determining a next, non-empty source queue to grant access to the link uses a round-robin scheduling.

19. The scheduler of claim 16 wherein the means for determining a non-empty source queue determines a next non-empty source queue to grant access to the link if the head-of-line cell is transmitted.

20. The scheduler of claim 16 wherein the means for determining a non-empty source queue determines a next non-empty source queue to grant access to the link if the head-of-line cell is transmitted and the head-of-line cell is an end-of-packet cell.

21. The scheduler of claim 16 wherein the means for determining a non-empty source queue determines a next non-empty source queue to grant access to the link if the head-of-line cell is transmitted and the head-of-line cell is a single-cell-packet cell.

22. The scheduler of claim 16 wherein the means for determining a non-empty source queue determines a next non-empty source queue to grant access to the link if the head-of-line cell is transmitted and the head-of-line cell is either an end-of-packet cell or a single-cell-packet cell, but otherwise, the same source queue will continue to have access to the link.

23. The scheduler of claim 16 wherein the means for determining whether or not to transmit a head-of-line cell of the determined non-empty source queue includes means for determining whether or not the head-of-line cell is eligible, wherein if the head-of-line cell is determined to be eligible, then transmitting the head-of-line cell, and wherein if the head-of-line cell is not determined to be eligible, then not transmitting the head-of-line cell.

24. The scheduler of claim 16 wherein the source module and the destination module are provided in a multi-plane, multistage switch having p planes, m central modules, and supporting q priorities, and wherein an egress traffic manager module needs only p*m*q reassembly queues to ensure packet reassembly.

25. The scheduler of claim 16 wherein the source module and the destination module are provided in a multi-plane, multistage switch having p planes and m central modules and wherein an egress traffic manager module needs only p*m reassembly queues to ensure packet reassembly.

26. The scheduler of claim 23 wherein the means for determining whether or not the head-of-line cell is eligible for transmission reserves memory space in a buffer in which the destination queue is defined for one or more partial packets stored in the destination queues.

27. The scheduler of claim 23 wherein the head-of-line cell is determined to be eligible if the head-of-line cell is a beginning-of-packet cell the destination queue is not storing cells of another packet a sum of a buffer outstanding cell count, a buffer reserved cell count and a maximum reserved cell constant is not greater than a size of a buffer in which the destination queue is defined, and a sum of a queue outstanding cell counter and the maximum reserved cell constant is not greater than a size of the destination queue.

28. The scheduler of claim 23 wherein the head-of-line cell is determined to be eligible if:

the head-of-line cell is one of a continue-of-packet cell and an end-of-packet cell, and a queue reserved cell count is greater than zero.

29. The scheduler of claim 23 wherein the head-of-line cell is determined to be eligible if:

the head-of-line cell is one of a continue-of-packet cell and an end-of-packet cell, a sum of a buffer outstanding cell count and a buffer reserved cell count is less than a size of a buffer in which the destination queue is defined, and a queue outstanding cell count is less than a size of the destination queue.

30. The scheduler of claim 23 wherein the head-of-line cell is determined to be eligible if:

the head-of-line cell is a single-cell-packet cell, the destination queue is not storing cells of another packet, a sum of a buffer outstanding cell count and a buffer reserved cell count is less than a size of a buffer in which the destination queue is defined, and a queue outstanding cell count is less than a size of the destination queue.

31. For use in a system having a source module with a plurality of source queues, each of the source queues for storing one or more cells of one or more packets, a destination module with a plurality of destination queues, each of the destination queues for storing one or more cells of one or more packets, and a multi-stage link between the source module and the destination module, a method for scheduling the communication of cells over the link comprising:

performing cell scheduling to determine which of a plurality of head-of-line cells to transmit over a link at any given time; and sending head-of-line cells in the source queues in accordance with the cell scheduling determinations, wherein the cell scheduling determinations are made wherein the determination is to transmit the-head-of line cell when the transmission of cells from the same packet would only be interleaved with cells of packets destined for different destination queues and the head-of-line cell is a beginning-of-packet cell, and a buffer has sufficient space for all cells stored in the plurality of destination queues, cells on the multi-stage link, and cells of partial packets in the plurality of source queues, and wherein the determination is not to transmit the-head-of line cell when the transmission of cells from the same packet would be interleaved with the transmission of cells of different packets destined for the same destination queue.

* * * * *

UNITED STATES PATENT AND TRADEMARK OFFICE
CERTIFICATE OF CORRECTION

PATENT NO. : 7,852,829 B2
APPLICATION NO. : 10/872332
DATED : December 14, 2010
INVENTOR(S) : Chao et al.

It is certified that error appears in the above-identified patent and that said Letters Patent is hereby corrected as shown below:

Title page, item (56), under "Other Publications", in Column 2, Line 1, delete "Cooperatve" and insert -- Cooperative --.

Title page 2, item (56), under "Other Publications", in Column 2, Line 3, delete "Final" and insert -- Non-Final --.

Sheet 13 of 13, Figure 15, Line 1, delete "Aerage" and insert -- Average --.

Column 1, line 21, delete "ANTI" and insert -- ANI --.

Column 6, line 48, delete "m:number" and insert -- m: number --.

Column 10, line 31, delete "empty,.the" and insert -- empty, the --.

Column 11, line 31, delete "to." and insert -- to --.

Column 12, line 65, delete "HoLl" and insert -- HOL --.

Column 13, line 35, delete "Hol" and insert -- HOL --.

Column 13, line 56, delete "DQ(O)" and insert -- DQ(0) --.

Column 14, line 22, in Claim 1, delete "the-head-of line" and insert -- the head-of-line --.

Column 14, lines 30-31, in Claim 1, delete "the-head-of line" and insert -- the head-of-line --.

Column 14, line 37, in Claim 1, delete "the-head-of line" and insert -- the head-of-line --.

Column 14, line 46, in Claim 4, delete "head-of line" and insert -- head-of-line --.

Signed and Sealed this
Twenty-fourth Day of May, 2011

David J. Kappos
*Director of the United States Patent and Trademark Office*

CERTIFICATE OF CORRECTION (continued)
U.S. Pat. No. 7,852,829 B2

Column 15, line 47, in Claim 15, after "single-cell-packet" delete "cell" and insert -- cell; --.

Column 15, line 48, in Claim 15, delete "packet" and insert -- packet; --.

Column 15, line 66, in Claim 16, delete "the-head-of line" and insert -- the head-of-line --.

Column 16, lines 7-8, in Claim 16, delete "the-head-of line" and insert -- the head-of-line --.

Column 16, line 12, in Claim 16, delete "the-head-of line" and insert -- the head-of-line --.

Column 17, line 4, in Claim 27, after "eligible" delete "if" and insert -- if: --.

Column 17, line 5, in Claim 27, after "beginning-of-packet" delete "cell" and insert -- cell; --.

Column 17, line 6, in Claim 27, delete "packet" and insert -- packet; --.

Column 18, line 20, in Claim 31, delete "the-head-of line" and insert -- the head-of-line --.

Column 18, line 28, in Claim 31, delete "the-head-of line" and insert -- the head-of-line --.